United States Patent [19]

Bauer et al.

[11] 4,281,315
[45] Jul. 28, 1981

[54] COLLECTION OF MESSAGES FROM DATA TERMINALS USING DIFFERENT PROTOCOLS AND FORMATS

[75] Inventors: Henry C. Bauer, Morganville; Gary J. Burns, Jackson; Clair A. Buzzard, Lincroft; Travis H. Gordon; Heinz Kahlbrock, both of Holmdel; Robert F. Ricca, Neptune; Robert M. Zachok, Lavallette, all of N.J.

[73] Assignee: Bell Telephone Laboratories, Incorporated, Murray Hill, N.J.

[21] Appl. No.: 69,975

[22] Filed: Aug. 27, 1979

[51] Int. Cl.³ .................. G06F 3/00; H04Q 5/00
[52] U.S. Cl. ............................. 340/147 R; 364/200
[58] Field of Search ............. 340/147 R; 364/200

[56] References Cited

U.S. PATENT DOCUMENTS

| | | | |
|---|---|---|---|
| 3,699,525 | 10/1972 | Klavins | 364/200 |
| 3,768,076 | 10/1973 | Recoque | 364/200 |
| 3,846,763 | 11/1974 | Riikonev | 364/200 |
| 4,058,838 | 10/1977 | Crager | 358/257 |
| 4,079,448 | 3/1978 | N'Guyen | 364/200 |
| 4,100,533 | 7/1978 | Napolitano | 340/147 R |
| 4,103,328 | 7/1978 | Dalmasso | 364/200 |

*Primary Examiner*—Harold I. Pitts
*Attorney, Agent, or Firm*—Roy C. Lipton

[57] ABSTRACT

A central controller (104) for a multipoint polling system arranged to collect inquiry messages from data terminals (102a–n, 103a–n) for processing by a data base (101) and for distributing response messages to the terminals, the several terminals using different communication protocols. The controller includes a RAM memory (203) which stores a list of items, each item identifying a terminal and the type of protocol used thereby, a ROM memory (202) which stores an instruction set for each protocol type and a microprocessor (201) which sequentially accesses each item on the list to poll the associated terminal and accesses the instruction set identified in the item to control sending and receiving equipment to query and intercommunicate with the selected terminal in accordance with the accessed instructions.

15 Claims, 19 Drawing Figures

*FIG. 6B*

| PROCESS FLOW | STATE OF PERIPHERAL HARDWARE | INSTRUCTIONS |
|---|---|---|
| 12 | VALID START OF MESSAGE | GET BUFFER FOR MESSAGE, PLACE POINTER TO ITEM IN BUFFER, AND PLACE FIRST CHARACTER IN BUFFER |
| 29 | 2-WIRE MESSAGE READY | SET POINTERS TO BEGINNING OF BUFFER AND TO FIRST CHARACTER OF MESSAGE, ACCESS ITEM IN POLL LIST, CONNECT TO PORT, TURN ON RS, TURN OFF PLCK, SET TIMER |
| 35 | 4-WIRE MESSAGE READY LAST ITEM 2-WIRE | SET POINTERS TO BEGINNING OF BUFFER AND TO FIRST CHARACTER OF MESSAGE, ACCESS ITEM IN POLL LIST, DISCONNECT PORT, TURN ON RS, TURN ON PLCK, SET TIMER |
| 36 | 4-WIRE MESSAGE READY LAST ITEM 2-WIRE | SAME AS 35 |
| 37 | 4-WIRE MESSAGE READY LAST ITEM 4-WIRE | SET POINTERS TO BEGINNING OF BUFFER AND TO FIRST CHARACTER OF MESSAGE, ACCESS NEXT ITEM, CONNECT PORT |
| 38 | 2-WIRE DETECT CARRIER ON | PUT USART IN SERIAL TO PARALLEL MODE |
| 39 | 2-WIRE DETECT CARRIER OFF | CHECK FOR MESSAGES TO TERMINALS, AND IF NONE SET UP TO POLL NEXT TERMINAL |
| 40 | 4-WIRE TIMEOUT OR EOT NEXT ITEM 4-WIRE | SAME AS 39 |
| 41 | 4-WIRE TIMEOUT | TURN ON PLCK, ENABLE USART SERIAL TO PARALLEL MODE |
| 42 | 4-WIRE TIMEOUT | SELECT PORT, DISABLE PLCK, ENABLE USART PARALLEL TO SERIAL MODE |
| 43 | 2-WIRE TIMEOUT | CONNECT TO 2-WIRE PORT, TURN ON RS AND SET TIMER |
| 44 | 2-WIRE TIMEOUT NEXT ITEM 4-WIRE | DETERMINE NEXT TERMINAL TO POLL OR SELECT, DISCONNECT ALL TERMINAL PORTS, TURN ON RS AND PLCK AND SET TIMER |
| 45 | 2-WIRE TIMEOUT | TURN OFF RS AND SET TIMER |
| 46 | 4-WIRE TIMEOUT OR EOT NEXT ITEM 2-WIRE | CHECK FOR MESSAGES TO TERMINALS, AND IF NONE SET UP TO POLL NEXT TERMINAL. TURN OFF RS AND SET TIMER |

FIG. 7A

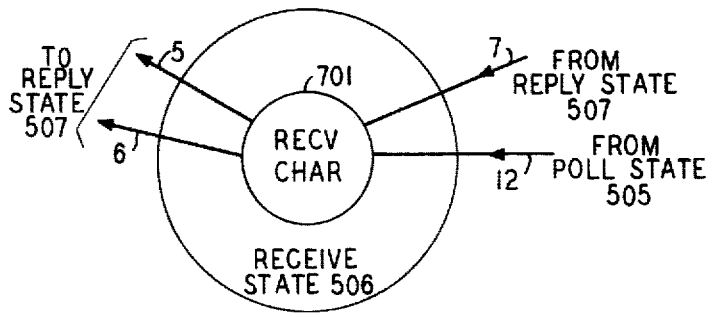

FIG. 7B

| PROCESS FLOW | STATE OF PERIPHERAL HARDWARE | INSTRUCTIONS |
|---|---|---|
| 5 | 4-WIRE END OF MESSAGE | DETERMINE IF MESSAGE SHOULD BE ACK'ED OR NAK'ED. IF NAK RELEASE BUFFER, TURN OFF PLCK, ENABLE USART PARALLEL TO SERIAL MODE |
| 6 | 2-WIRE DETECT CARRIER OFF | DETERMINE IF MESSAGE SHOULD BE ACK'ED OR NAK'ED. IF NAK, RELEASE BUFFER, TURN ON RS AND SET TIMER |

FIG. 9A

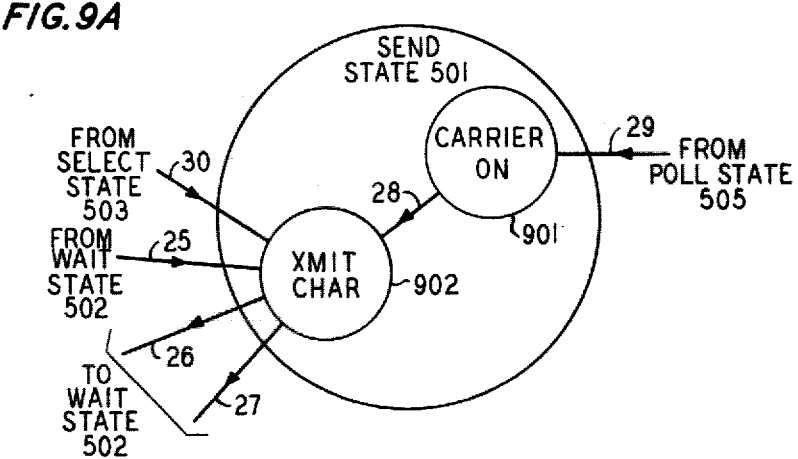

FIG. 9B

| PROCESS FLOW | STATE OF PERIPHERAL HARDWARE | INSTRUCTIONS |
|---|---|---|
| 26 | 4-WIRE TIMEOUT | TURN ON PLCK, ENABLE USART PARALLEL TO SERIAL MODE |
| 27 | 2-WIRE TIMEOUT | DISABLE USART PARALLEL TO SERIAL MODE, TURN OFF RS |
| 28 | 2-WIRE TIMEOUT | ENABLE USART PARALLEL TO SERIAL MODE |

FIG. 8A

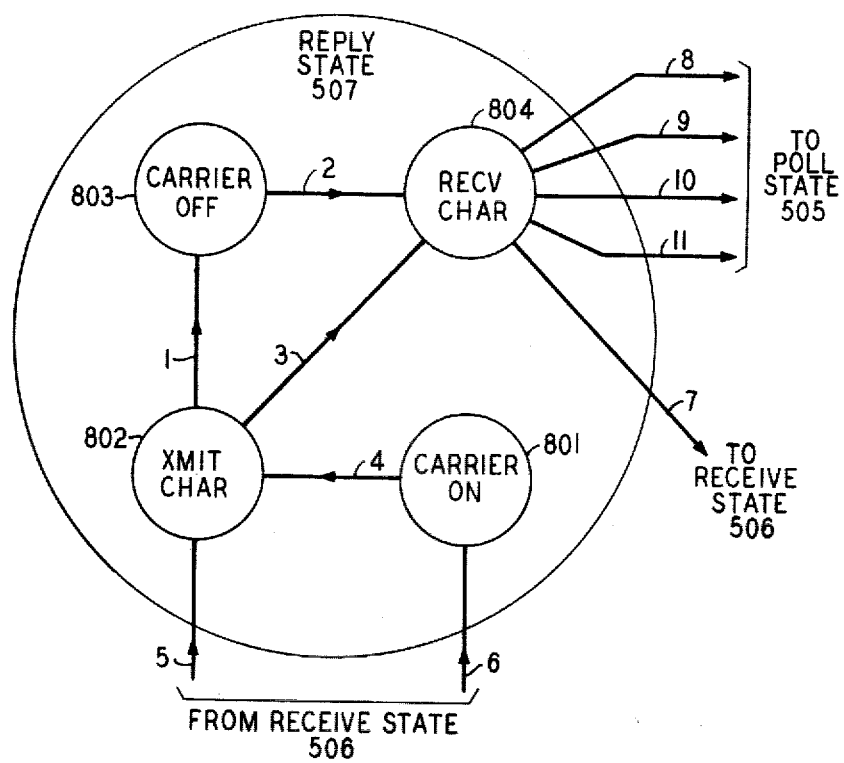

FIG. 8B

| PROCESS FLOW | STATE OF PERIPHERAL HARDWARE | INSTRUCTIONS |
|---|---|---|
| 1 | 2-WIRE TIMEOUT | DISABLE USART PARALLEL TO SERIAL MODE, TURN OFF RS |
| 2 | 2-WIRE DETECT CARRIER | PUT USART IN SERIAL TO PARALLEL MODE |
| 3 | 4-WIRE TIMEOUT | TURN ON PLCK, ENABLE USART SERIAL TO PARALLEL MODE |
| 4 | TIMEOUT | ENABLE USART PARALLEL TO SERIAL MODE |
| 7 | 4-WIRE NAK SENT START OF MESSAGE RECEIVED | SAME AS 3 |
| 8 | 2-WIRE DETECT CARRIER OFF (RECV EOT) NEXT ITEM 4-WIRE | DETERMINE NEXT TERMINAL TO POLL OR SELECT, DISCONNECT ALL TERMINAL PORTS, TURN ON RS AND PLCK AND SET TIMER |
| 9 | 4-WIRE RECV EOT OR 2 NAKS SENT, NEXT ITEM 2-WIRE | PREPARE TO POLL OR SELECT NEXT TERMINAL |
| 10 | 2-WIRE DETECT CARRIER OFF RECV EOT NEXT ITEM 2-WIRE | SAME AS 9 |
| 11 | 4-WIRE RECV EOT OR 2 NAKS SENT, NEXT ITEM 4-WIRE | PLACE BUFFER ON REFORMAT QUEUE IF REPLY WAS ACK, DETERMINE NEXT TERMINAL, TURN OFF PLCK, ENABLE USART PARALLEL TO SERIAL MODE |

FIG. 10A

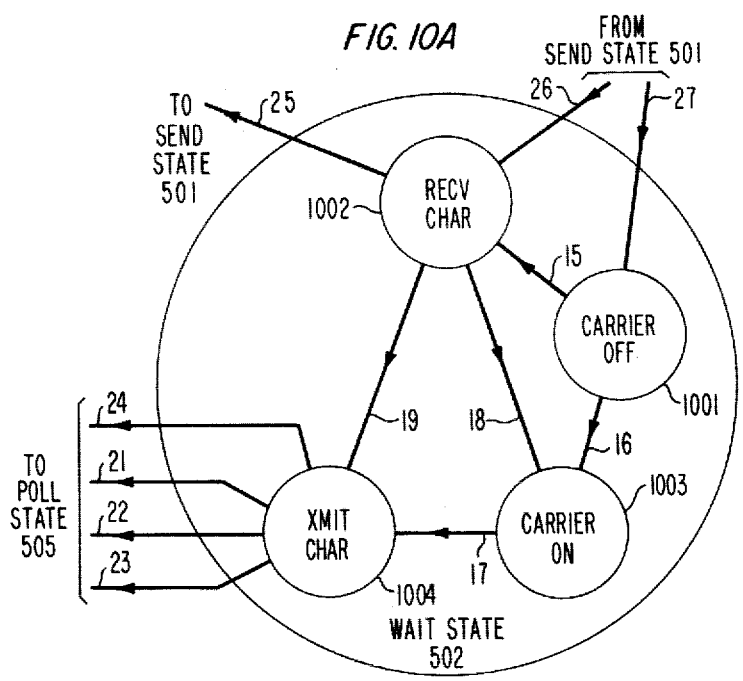

FIG. 10B

| PROCESS FLOW | STATE OF PERIPHERAL HARDWARE | INSTRUCTIONS |
|---|---|---|
| 15 | 2-WIRE DETECT CARRIER ON | PUT USART IN SERIAL TO PARALLEL MODE |
| 16 | TIMEOUT | TURN ON RS, TURN OFF PLCK, SET TIMER |
| 17 | TIMEOUT | ENABLE USART PARALLEL TO SERIAL MODE |
| 18 | 2-WIRE DETECT CARRIER OFF | IF ACK, FREE BUFFER, IF NAK AND SECOND TRANSMISSION, PLACE ON REFORMAT QUEUE, INDICATE UNDELIVERABLE, OTHERWISE MARK FOR RETRANSMISSION. TURN ON RS, SET TIMER |
| 19 | 4-WIRE ACK OR SECOND NAK RECEIVED | IF NAK, PLACE BUFFER ON REFORMAT QUEUE, INDICATE RETURN TO DATA BASE. IF ACK, FREE BUFFER, STORE EOT, TURN OFF PLCK, ENABLE USART PARALLEL TO SERIAL MODE |
| 21 | 2-WIRE TIMEOUT NEXT ITEM 4-WIRE | DETERMINE NEXT TERMINAL TO POLL OR SELECT, DISCONNECT ALL TERMINAL PORTS, TURN ON RS AND PLCK AND SET TIMER |
| 22 | TIMEOUT NEXT ITEM 2-WIRE | CHECK FOR MESSAGES TO TERMINALS, AND IF NONE SET UP TO POLL NEXT TERMINAL |
| 23 | 4-WIRE TIMEOUT NEXT ITEM 4-WIRE | SAME AS 22 |
| 24 | 2-WIRE TIMEOUT NAK RECEIVED | TURN OFF RS, SET TIMER AND THEN SAME AS 22 |
| 25 | 4-WIRE NAK RECEIVED | SET POINTER TO FIRST CHARACTER IN BUFFER, ENABLE USART PARALLEL TO SERIAL MODE, TURN OFF PLCK |

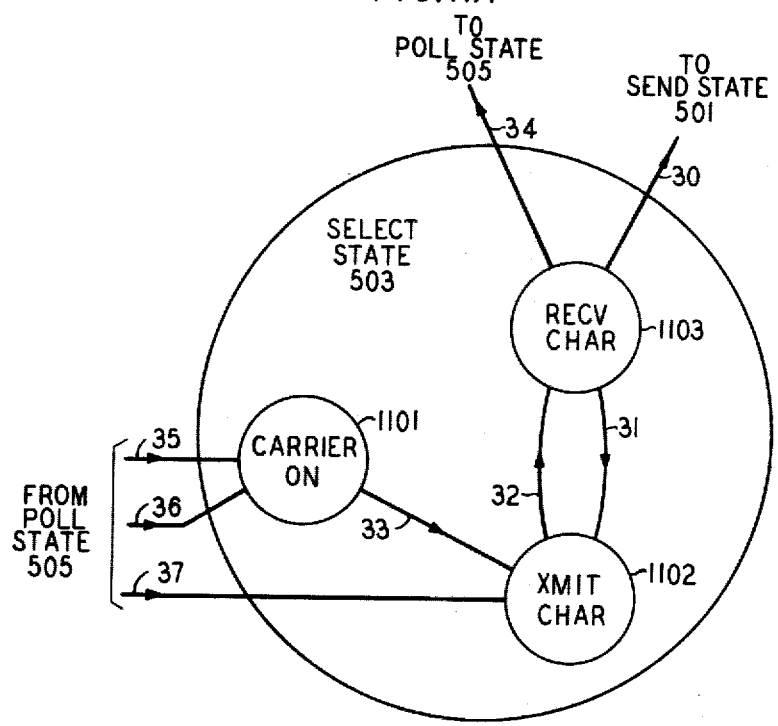

| PROCESS FLOW | STATE OF PERIPHERAL HARDWARE | INSTRUCTIONS |
|---|---|---|
| 30 | 4-WIRE ACK RECEIVED | TURN OFF PLCK, ENABLE USART PARALLEL TO SERIAL MODE |
| 31 | NAK RECEIVED | TURN OFF PLCK, ENABLE PARALLEL TO SERIAL MODE, PREPARE TO RESEND SELECT SEQUENCE TO TERMINAL |
| 32 | TIMEOUT | TURN ON PLCK, ENABLE USART SERIAL TO PARALLEL MODE |
| 33 | TIMEOUT | SET POINTERS TO BEGINNING OF BUFFER AND TO FIRST CHARACTER OF MESSAGE, ACCESS ITEM IN POLL LIST, CONNECT TO PORT, TURN ON RS, TURN OFF PLCK, SET TIMER |
| 34 | 4 NAK'S RECEIVED NEXT ITEM 2-WIRE | PLACE BUFFER ON REFORMAT QUEUE, INDICATE TO BE RETURNED TO DATA BASE. DETERMINE NEXT TERMINAL |

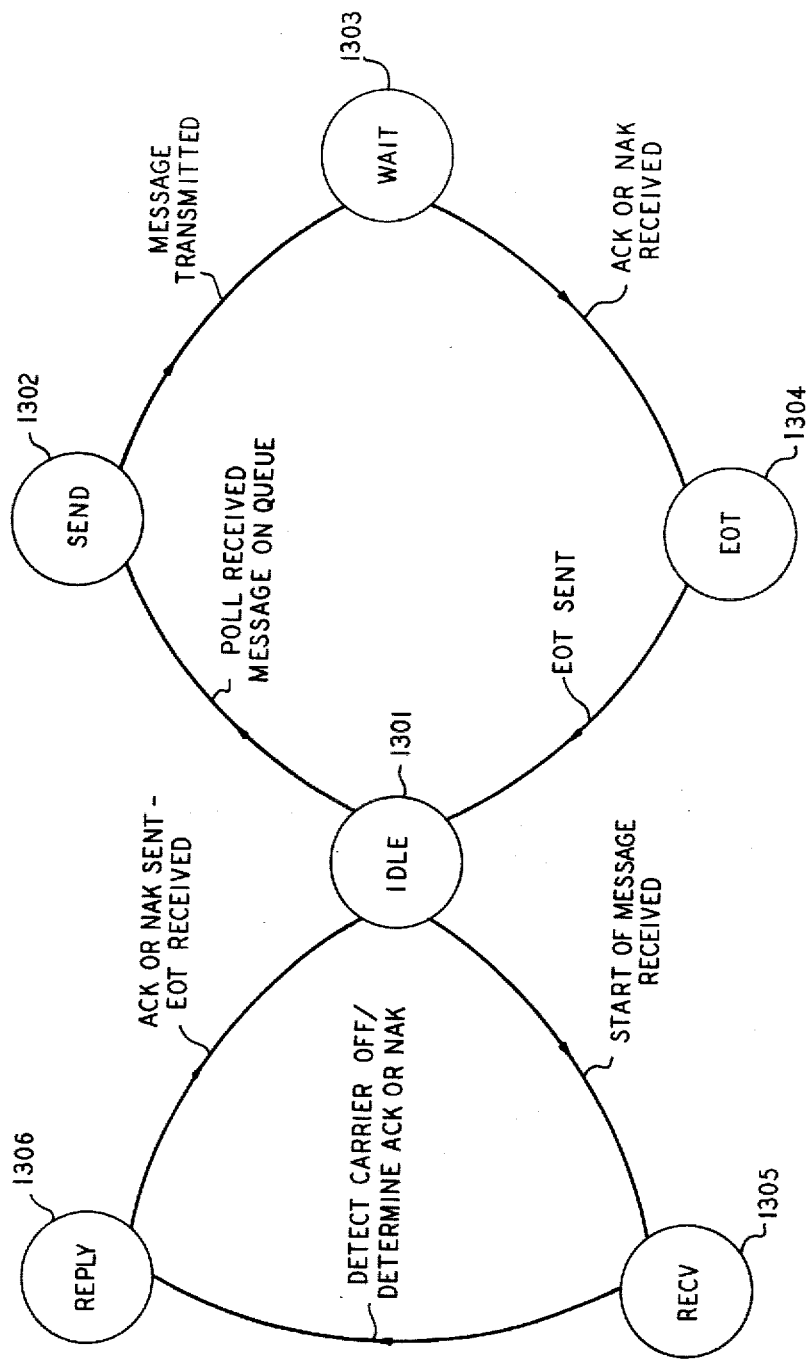
FIG. 13  DATA BASE COMMUNICATION PROCESS

COLLECTION OF MESSAGES FROM DATA TERMINALS USING DIFFERENT PROTOCOLS AND FORMATS

TECHNICAL FIELD

This invention relates to multipoint polling systems and, more particularly, to systems wherein a central station selectively accesses a plurality of remote data terminals to intercommunicate with the selected terminals.

BACKGROUND OF THE INVENTION

In certain data message communication systems, a central station data base collects inquiry messages or "transactions" from and distributes response messages to data terminals. In systems of this type, it is often desirable to provide polling apparatus (sometimes called a controller) which sequentially polls the several terminals to determine whether they have available messages. More specifically, the polling apparatus connects to each terminal and thereafter interchanges control signals with the terminal in accordance with a communication procedure or protocol, which protocol involves a procedure of signal interchange that advises the terminal that it is being polled, advises the controller whether a message is available, enables the controller to recognize the correct reception of a complete message and advises the terminal that the controller correctly received the message.

A polling system arranged to provide the above-described polling is described in U.S. Pat. No. 4,100,533 issued to O. Napolitano et al on July 11, 1978. The Napolitano et al arrangement utilizes a multipoint switch which, in response to selection signals, connects each of a plurality of terminals to a central controller. These selection signals are generated by the controller polling apparatus which has stored therein a list of items, each item defining the appropriate selection signals for a corresponding one of the terminals. The controller sequentially accesses each item in the list to enable the generation of the appropriate selection signals whereby the multipoint switch connects the controller to the corresponding terminal. The controller then proceeds to interchange the control signals to query the terminal and collect the message or proceed to the next terminal by accessing the next item on the list.

Data terminals are produced by many different manufacturers, each manufacturing service providing various advantageous features. In large data message communication systems, it is often desirable to utilize terminals of different manufacturing sources at different ones of the remote locations. It may also be desirable to utilize a terminal of one source at one remote location during one period of time and a terminal of a different source during another period of time. Unfortunately, the several manufacturers of terminals do not produce machines using the same communicatiion procedures. For example, one terminal may be queried through the use of a prolonged carrier signal while another through the use of a data character sequence which includes a character or characters individual in the communication system, to this machine. In addition, one machine may terminate messages with a character sequence differing from other machines or look for acknowledgements for its message differing from other machines. Accordingly, to provide a polling system for terminals from different manufacturers, it is necessary for the central controllers for each terminal polled to send the appropriate selection signals while using the appropriate communication procedure (protocol) to connect the poller to the terminal, then interchange the appropriate control signals to query the terminal and finally intercommunicate during and after the message with the appropriate protocol.

It is an object of this invention to provide a polling system accommodating data terminals arranged to utilize different communication procedures. It is a further object to provide different procedures without substantial changes in the system each time a terminal is changed.

SUMMARY OF THE INVENTION

The above-identified objects are achieved in the multiterminal polling system by storing sets of instructions individually defining a different one of several communication procedures and, as each item of the polling list is accessed, accessing the instruction set defining the protocol used by the terminal to be polled and controlling the controller sending and receiving equipment in accordance with the accessed instruction set. More specifically, each poll list item also identifies the protocol for the corresponding terminal and the controller uses this identification to access the appropriate instruction set.

It is a feature of this invention that one of the sets of instructions instructs the controller to send selection signals including a sequence of data characters and another one of the sets of instructions instructs the controller to send selection signals including a prolonged signal.

In accordance with another feature of this invention, the controller is instructed by one set of instructions to recognize certain signals from the selected terminal and to send selected signals and is instructed by another set of instructions to recognize other certain signals from the selected terminal and to send other selected signals.

The foregoing and other objects and features of this invention will be more fully understood from the following description of an illustrative embodiment thereof taken on conjunction with the accompanying drawings.

BRIEF DESCRIPTION OF THE DRAWING

In the drawings:

FIGS. 6A, 7A, 8A, 9A, 10A and 11A depict, in detail, each of the various states of the data terminal transaction process and FIGS. 6B, 7B, 8B, 9B, 10B and 11B show tables describing process flow in each of the accompanying states;

FIG. 13 shows a state diagram of the various states of the process followed by the microcomputer in handling transactions with the data base.

DETAILED DESCRIPTION

Figure 1:
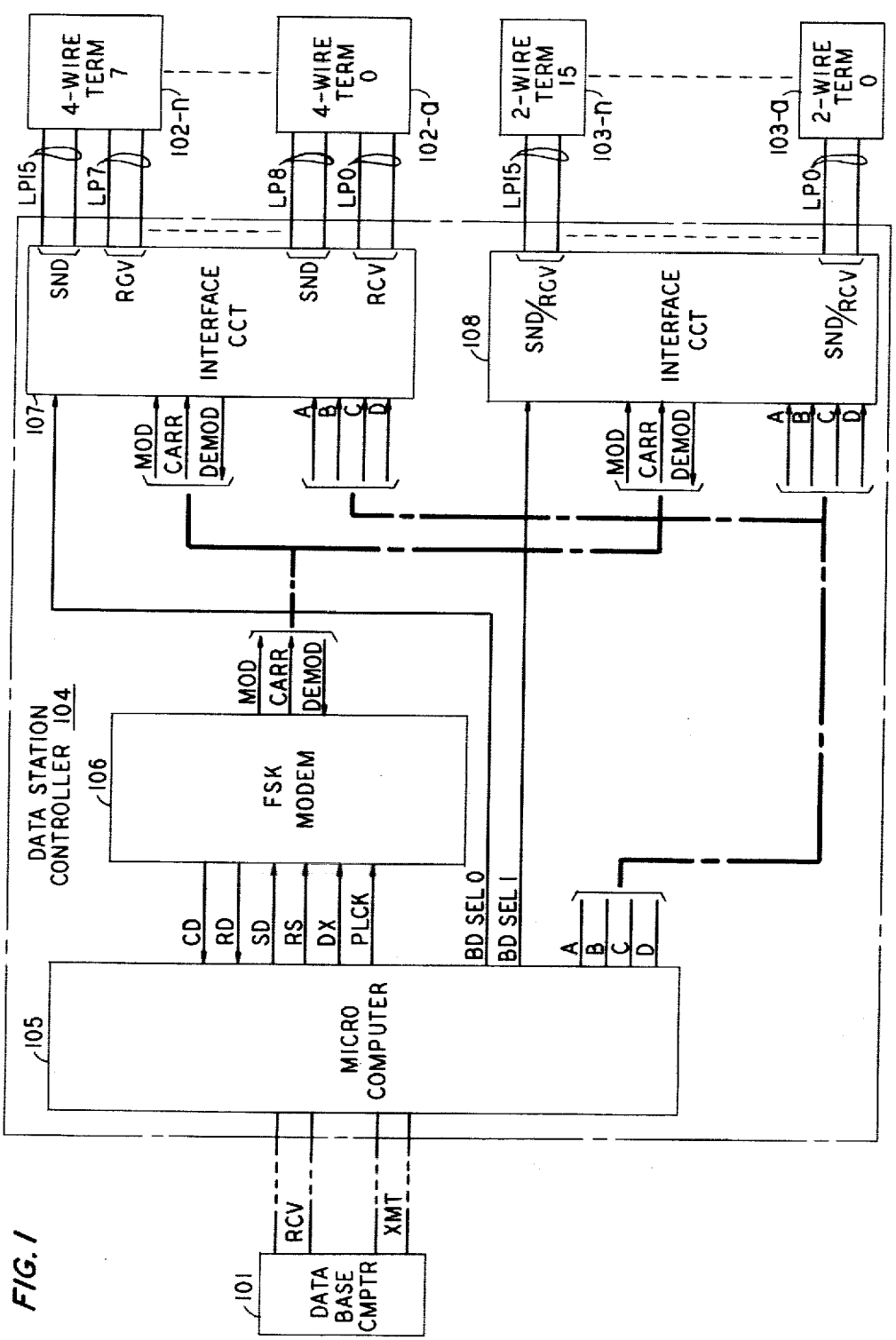
FIG. 1 shows, in block form, a data message communication system including a data base and a central controller for collecting inquiry messages from and distributing response messages to data terminals in accordance with this invention.

A typical message collection system is shown in block form in FIG. 1. The system includes data base 101, a plurality of data terminals 102a to 102n and 103a to 103n and data station controller 104. The data base 101 is typically located at subscriber premises, which data base provides the functions of receiving and analyzing transaction messages from the terminals and returning appropriate message responses to the various terminals.

The several terminals are generally located at subscriber locations remote from the data base location. Each terminal has the capability of storing locally generated messages and, upon being polled or called by controller 104, of sending the message stored therein and thereafter of receiving any message response from the data base. Each of the terminals use one of two types of known communication procedures. Terminals 103a to 103n are two-wire terminals sending and receiving frequency shift (fsk) asynchronous data. These terminals are started up, to send a transaction stored therein, in response to the reception of a 1200 Hz carrier burst. The message format provided by these terminals includes a heading field having a destination address and the terminal identification number followed by a text field. Terminals 102a to 102n are four-wire terminals, sending and receiving fsk asynchronous data on different two-wire pairs. The message format only includes a text field, which has the address and terminal identification number included therein. Carrier is always received on the receive pair and selection of the terminal to send a stored transaction is in response to the reception of a poll or select sequence.

Data station controller 104 which is typically located at a telephone central office includes a microcomputer, generally indicated by block 105, a modem shown as block 106, a 4-wire interface circuit 107 and a 2-wire interface circuit 108. The modem, in general, provides communication between microcomputer 105 and the various terminals by way of the interface circuits. The modem includes conventional modulating and demodulating and carrier detecting equipment, and carrier supplies to supply continuous carrier to the 4-wire terminals together with a phase lock loop to lock the continuous carrier to the modulator output to prevent phase discontinuities, all described in further detail hereinafter.

The interface circuits 107 and 108 provide the functions of switching through a transmission path from modem 106 to a selected terminal under control of selection signals from microcomputer 105. Interface circuit 107 can connect the modem to one of eight 4-wire ports; interface circuit 108 can connect the modem to one of sixteen 2-wire ports.

The microcomputer controls the mode of modem 106 and supplies data thereto. These controls include activating lead RS to turn on the modem carrier, signaling via lead DX to convert the modem to the half-duplex 2-wire or full-duplex 4-wire mode and signaling the modem by way of lead PLCK to phase lock the continuous carrier on output lead CARR when the modem is communicating with a 4-wire terminal.

The microcomputer identifies the terminal which it desires to communicate with and, in accordance with its identification, sends selection signals by way of leads BD SEL0 and BD SEL1 and leads A-D to interface circuits 107 and 108. The appropriate one of the interface circuits is selected by the signal on leads BD SEL0 and BD SEL1 and this selected interface circuit thereupon recognizes the selection signals on leads A-D and interconnects the appropriate terminal to the modem. A two-way transmission path is now established between the modem and the selected terminal.

In the case of a selected two-wire terminal, with the modem in the half duplex mode, lead DEMOD carries the modulated signal output of the modem for transmission to the terminal and also carries the signals from the terminal for application to the modem demodulator. In the case of a selected four-wire terminal, the modulated signal output of the modem is applied to lead MOD. Signals from the terminal are received on lead DEMOD. In any event, continuous carrier is always applied to lead CARR for transmission to all unselected 4-wire terminals.

The microcomputer receives the serial demodulated data from the modem on lead RD together with the carrier detect signal on lead CD. The data thus received by the microcomputer is processed and sent on to the data base by way of another modem, for example, (assuming that the interconnection with the data base is by way of a telephone line). The response from the data base is then returned to the microcomputer which again "selects" the terminal and sends response data to the modem by way of the SD lead. The modem modulates the modulator carrier with this data, applying these signals to lead MOD, when in the full-duplex mode, or to lead DEMOD, when in the half-duplex mode, for transmission on to the terminal.

The microcomputer in its initial condition has a polling list of terminals stored in its memory, which list identifies which terminals will be polled and the sequence of the polling. This list is inserted into the microcomputer memory in any conventional manner; for example, by the transmission of a message or series of messages from the data base directed to the microcomputer or by initially implementing the microcomputer memory with the polling list information. Each item in the poll list comprises a block of data which defines the type of terminal (that is, the characteristics of the terminal such as whether it is 2-wire or 4-wire and its protocol and message format), the physical address of the terminal together with its identification number and a poll/select number for the terminal if the terminal requires a poll or selection character to start the terminal.

In this system the microcomputer advances from an initial idle state to a poll state in response to a message from the data base instructing the data station controller to initiate polling. The microcomputer first looks at its message buffers to see if it has a message to send to the terminals. After sending these messages, as described below, or in the absence of any messages in the buffer, the microcomputer proceeds to look at the first item in the polling list.

Assume that the first item in the list defines a 2-wire terminal. Further assume that the terminal has a transaction message to send to the data base. The microcomputer accesses the first item on the list, retrieves the information and stores the various information of the item in predetermined memory locations. In this case, it is a 2-wire terminal having the protocol and message format defined above for 2-wire terminals. In response to the type information in the item, the microcomputer thereupon provides an appropriate signal to the DX lead to prepare the modem to operate in the half duplex mode. In this mode, the signals sent by the modem to the terminal and the signals received by the modem from the terminal will both appear on lead DEMOD.

In response to the address information in the item, the microcomputer applies the appropriate selection signals to leads A, B, C and D and energizes lead BD SEL1 to thereby select interface circuit 108. The selection signals are read by the selected interface circuit 108 to set up a communication path between the modem and the selected 2-wire terminal or, more specifically, to connect lead DEMOD to the telephone pair extending to the terminal. (It is noted in the initial condition that the microcomputer normally applies a marking state to lead SD.)

In response to the type information, the microcomputer energizes the RS lead for a predetermined timed interval. The modem, in turn, applies 1200 Hz to lead DEMOD for that timed interval and this carrier is sent on to the terminal. The two-wire terminal recognizes the timed interval carrier as a polling signal. At the end of that interval, the microcomputer turns off the RS lead and, at that point, the carrier on lead DEMOD drops. The terminal, upon recognizing that the carrier dropped, turns on its carrier and proceeds to return the transaction message in the format described above for 2-wire terminals. At the end of the transmission of the message, the terminal drops its carrier.

When modem 106 detects the incoming carrier, it energizes lead CD. The incoming transaction message is passed by way of the interface circuit to the modem 106. The information is demodulated and the data is passed by way of lead RD to the microcomputer 105. The incoming data on lead RD is inspected by the microcomputer which stores the data in a message buffer and performs various parity and sanity checks described in further detail hereinafter. At the end of the transaction message, the terminal sends a redundancy check character and drops its carrier and when the carrier is no longer detected by the modem 106, it drops its signal on lead CD. The microcomputer 105 thereupon makes its determination as to whether the message has been received properly.

In the event that the transaction message was properly received, the microcomputer 105 will return a positive acknowledgement sequence (ACK). More specifically, the microcomputer will re-energize the request to send (RS) lead and apply the positive acknowledgement code sequence to lead SD. This acknowledgement sequence is thereupon sent by the modem 106 back to the 2-wire terminal.

In the event that the checks on the transaction message failed, the data in the message buffer is discarded and the negative acknowledgement (NAK) sequence is applied to lead SD for passage back to the terminal. In either event, the RS lead is then turned off and the carrier on lead DEMOD is dropped.

In response to the dropping of the carrier, the 2-wire terminal raises its carrier, sends the end of transmission (EOT) sequence back to the data station controller 104 and turns off its carrier. If the terminal had received a positive acknowledgement to its message, its function with respect to the message is now finished. If it had received a negative acknowledgement, however, it will retain the transaction message and send it upon its next poll. The terminal is then conventionally arranged to repeat the message (assuming unsuccessful transmissions for a predetermined number of polls) and then take some local action, such as discarding the message. At the microcomputer, the successfully received transaction message received from the 2-wire terminal is stored in buffer memory. When the EOT is received from the terminal, the successfully received message is reformatted, if necessary, for subsequent transmission to the data base.

After the reception of the EOT from the terminal, the microcomputer 105 accesses the next item in the poll list, storing the elements of the item in the above-mentioned predetermined locations of the memory. Let us assume that another 2-wire terminal is to be polled, but this terminal has no message to send. The microcomputer proceeds to place the modem 106 in the half duplex mode, select the appropriate output port in the interface circuit 108, and raise the RS lead of the modem 106 to thereby send the timed carrier to the terminal. The terminal, since it has no message to send, does not respond to the poll carrier. The microcomputer 105 seeing no carrier from the terminal within a predetermined interval of time assumes that the terminal has no message to send. Microcomputer 105 access the buffer memory for messages destined to the terminals and, assuming the absence of such messages, thereupon proceeds to the next item in the list.

Assume now that the next item in the list defines a 4-wire terminal and that this terminal has a transaction message to send to the data base. In response to the information in the list relating to the terminal type, (i.e., 4-wire) the microcomputer 105 deselects interface circuits 108 by dropping the signal on lead BD SEL1 to thereby insure that carrier will not be sent to the previously selected 2-wire terminal. The microcomputer also operates the DX lead to place the modem in the full duplex mode. In addition, the RS lead is operated to raise carrier and the PLCK lead is energized. In response to the energization of the DX lead, modem 106 applies the output of the modulator therein to lead MOD and extends lead DEMOD exclusively to the input of its demodulator. With the RS lead raised, the modem carrier thus raised is passed to lead MOD. In response to the energization of the PLCK lead, carrier on lead CARR is phase locked to the carrier on lead MOD.

It is to be noted that with respect to the 4-wire terminal, carrier is normally sent thereto by the modem via lead CARR. It is the function of the phase lock loop circuit in modem 106 to initially bring this continuous carrier into phase with the carrier on lead MOD so that when there is a transmission to a 4-wire terminal and the signaling thereto switches from the carrier on lead CARR to the signals on lead MOD, there will not be a phase discontinuity. After a predetermined interval of time to allow the CARR lead carrier to phase lock, the microcomputer places the appropriate address on leads A–D and energizes lead BD SEL0 to thereby select interface circuit 107 and connect modem 106 to the appropriate 4-wire port. A transmission path is now completed between lead DEMOD and the receive pair of the telephone line extending to the 4-wire terminal and, at the same time, the send pair of the 4-wire terminal is switched from lead CARR to lead MOD. The send pairs of the other 4-wire ports, of course, are still receiving carrier from lead CARR. At this point, lead PLCK is released and the lock of the carrier on lead CARR is discontinued.

In response to the 4-wire terminal type information together with the poll/select number in the data list item, the microcomputer sends a sequence of characters comprising a poll sequence which includes a poll character derived from the poll/select number. At the end of this sequence, since the RS lead is still up, continuous carrier is sent to the selected 4-wire terminal from the modulator of the modem. At the same time, lead PLCK is re-energized, relocking the carrier on lead CARR to the carrier on lead MOD.

The 4-wire terminal, recognizing the poll sequence including the poll character unique to it in the sequence, proceeds to raise its carrier and transmit the transaction message in the format described above which is unique to the 4-wire terminals. After the message is transmitted, the terminal continues to send carrier, awaiting the response from the data station controller 104.

The incoming transaction message is received on lead DEMOD and the demodulated bitstream is passed by lead RD to the microcomputer 105. The microcomputer now proceeds to provide the parity and sanity checks appropriate for this particular terminal. At the end of the message an end of text character (ETX) and a redundancy check character are received from the terminal and these characters are recognized by the microcomputer which then makes a determination as to the success or failure of the reception of a proper transaction message. The microcomputer thereupon drops the PLCK lead to unlock the carrier on lead CARR. If the message was received properly, a positive acknowledgement character (ACK) is applied to lead SD. Alternatively, if the message was received improperly, a negative acknowledgement character (NAK) is applied to lead SD. In either event, this character is modulated on the carrier and passed to the 4-wire terminal. Thereafter, lead PLCK is again raised to lock the carrier on lead CARR to that on lead MOD.

If the data station controller acknowledgement to the message is positive (ACK), the terminal will send the EOT character and then drop carrier. If the data station controller response to the message is NAK, the terminal will immediately resend the transaction message and the data station controller will go through the same processing of the message as previously described.

With respect to the negatively acknowledged message, the terminal will continue to send the message until it receives a positive acknowledgement or a new polling. In the event that it fails to receive a positive acknowledgement, the terminal is arranged to stop sending when it receives the polling and drop its carrier without transmitting the EOT character. The terminal will then take some appropriate local action.

At the data station controller the microcomputer 105 will place the message in a buffer in the event that it has sent a positive acknowledgement and received the EOT character. This successfully received message is then reformatted and transmitted on to the data base. In the event, however, that the message is not successfully received, it will simply be disregarded by the microcomputer.

The microcomputer proceeds to access the next item in the list when an EOT character is received from the terminal after the transmission of a successful message or alternatively after a predetermined delay subsequent to the reception of an unsuccessful message, the predetermined delay being provided after the above described raising of lead PLCK to permit the CARR carrier to phase lock to the modulator. Assume that the next terminal is a 4-wire terminal with no message to transmit, the initial polling of this terminal is the same as the previously described 4-wire terminal, with the exception that the interface circuit 106 is not unselected since the prior polling was for a 4-wire terminal. The selected terminal in response to the polling thereof conventionally raises carrier and returns an EOT character. Alternatively, the terminal may fail to respond and thereby not send back carrier or the EOT character. In the former case, the microcomputer recognizes the EOT character and then simply proceeds to the next item in the polling list. In the latter case, in the absence of a response, the microcomputer 105 after a timed interval recognizes that there will be no response to the polling and similarly proceeds to the next item in the polling list.

Messages from the data base 101 destined for the several terminals are delivered into buffers by the microcomputer, these messages typically having a header portion which includes the identity number of the terminal. The microcomputer 105 detects the identity number, searches the poll list until it finds the corresponding identity number therein and stores in the buffer containing the message a pointer which points to that item in the poll list which identifies the terminal to which the message is destined. The microcomputer then acknowledges the reception of the message, sending an acknowledgment sequence back to the data base and proceeds to reformat the message. The reformatter having access to the item in the polling list reformats the message in accordance with the type of terminal that the message is directed. For example, if the addressee terminal is a 4-wire terminal, the header is removed and only the message text will thus be subsequently sent on to the terminal.

As previously noted, the delivery of messages to the terminal has priority over the collection of messages from the terminal. Assume therefore that the microcomputer buffer has a message destined for a 2-wire terminal and further assume that the polling of a terminal and the transaction therewith has been completed. The microcomputer will thereupon look for an available message in its buffers and finding this message will access the item in the polling list identified by the pointer stored in the buffer. The microcomputer will thereupon proceed to place the modem 106 in the half duplex mode, select interface circuit 108 and connect the modem 106 to the terminal in the same manner as microcomputer 105 had provided these functions when it was polling the terminal. It will thereupon operate lead RS to raise the carrier for the transmission of the message. It will thereafter proceed to send the message data to lead SD whereby the modem 106 will initially send carrier to the terminal and thereafter modulate the carrier with the message from the data base.

When the transmission of the message is complete, the microcomputer will lower the RS lead permitting the carrier to drop. The 2-wire terminal may be advantageously arranged to provide a series of checks on this message. In any event, upon receiving the end of the message from the data station controller 104, the 2-wire terminal is arranged to raise its own carrier and returns a positive acknowledgement if the message was properly received or a negative acknowledgement if the message was improperly received and then to drop its carrier. The microcomputer, upon receiving the acknowledgement, positive or negative, raises the carrier of the modem 106 and transmits an EOT sequence and then drops the carrier. If the acknowledgement was a positive acknowledgement, the microcomputer proceeds to examine its buffers for another message to send to a terminal. If no further messages are in the buffers, it will resume polling at the point in the sequence where it left off to send this message to the terminal.

If there is a negative response from the terminal, the microcomputer proceeds to again send the message to the terminal, going through the same operation as described above for the first transmission. If the microcomputer gets back a positive acknowledgement to the second transmission, it returns to the polling cycle. Alternatively, if it gets back a negative response, it returns the message to the data base together with an indication in the header that the message was undeliverable. The microcomputer thereupon resumes the polling cycle.

Assume now that a message destined for a 4-wire terminal is in a microcomputer buffer. The microcomputer, on recognizing the identification number of the terminal, retrieves the poll list item pointer and proceeds to access the item in the polling list identifying the terminal to which the message is destined. Determining that this is a 4-wire terminal, the microcomputer will select interface circuit 107. The microcomputer will place the modem 106 in the full duplex mode and proceed to select the 4-wire terminal in the same manner as previously described for the manner in which the controller polled the 4-wire terminal with the exception that a select sequence is sent to the terminal in place of the poll sequence. This select sequence is similar to the poll sequence with the exception that a select character is inserted in the sequence rather than a poll character. The terminal recognizing the select sequence will respond with either a positive selection acknowledgement sequence or a negative selection acknowledgement character, the latter being returned in the event that the terminal is not in condition to receive the message.

In the event that a positive selection acknowledgement sequence is returned by the terminal, the microcomputer, upon recognition thereof, sends the message in the buffer, as reformatted, to the terminal. Advantageously, the terminal provides various checks on the message and if the message is properly received, returns a positive acknowledgement. If the message is not properly received, the terminal returns a negative acknowledgement. If the microcomputer receives a positive acknowledgement, it will send an EOT character to the terminal and resume polling. In the event that the message was not properly received by the terminal and the terminal has returned a negative acknowledgement, the microcomputer again sends the message in the same manner as previously described. If the terminal thereupon returns a positive acknowledgement, the microcomputer resumes the polling cycle after sending the EOT character to the terminal. In the event, however, that the terminal returns a negative acknowledgement, the microcomputer will proceed to send the EOT character back to the terminal but, in this case, will return the message to the data base and insert in the heading thereof an indication that the message was undeliverable. In either event, the microcomputer returns to the polling cycle.

Assume now that the terminal returns a negative selection acknowledgement character in response to the select sequence. In respose to the negative selection acknowledgement, the microcomputer again sends the select sequence to the terminal for at least two more times and, in the absence of a positive selection acknowledgement, returns the message to the data base with an indication in the header that the message is undeliverable.

Figure 2:
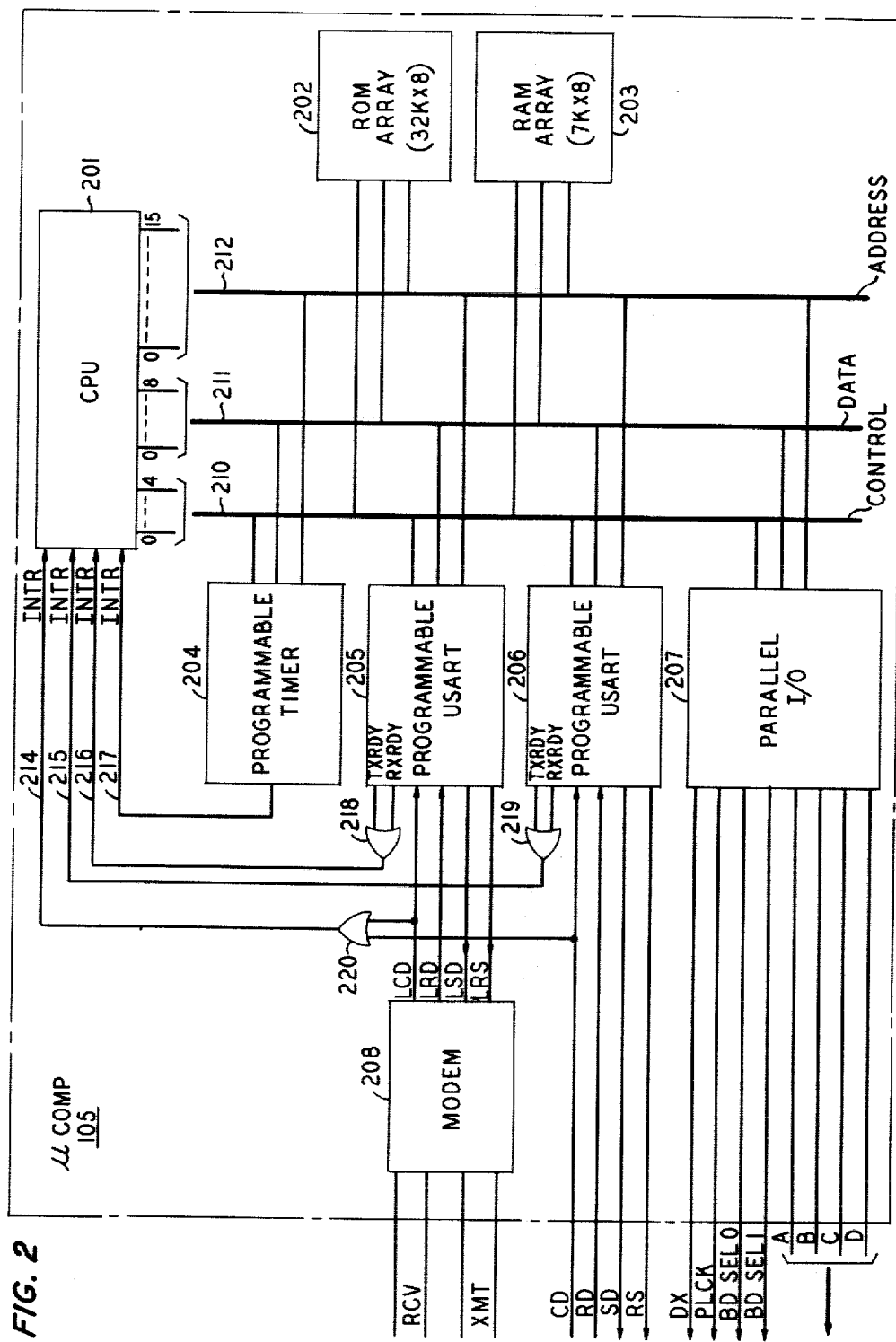
FIG. 2 discloses, in schematic form, the details of a microcomputer used in the central controller in accordance with this invention.

The details of microcomputer 105 are shown in FIG. 2. In general, the microcomputer includes a microprocessor (CPU) 201, a read-only memory (ROM) 202, a random access read/write memory (RAM) 203, programmable timer circuit 204, first and second programmable universal synchronous/asynchronous receive transmitters (USART) 205 and 206 and parallel in/out circuit 207. When the microcomputer 105 is connected to the data base 101 by way of telephone lines, a modem is conventionally used, such as modem 28, which modem is substantially identical to modem 106 described hereinafter.

The CPU 201 comprises a conventional microprocessor, such as the Intel 8080, which microprocessor is arranged in a conventional manner to have a multilevel prioritized interrupt structure. Commands from the microprocessor are by way of a 5-bit control bus 210, and 8-bit data bus 211 and a 16-bit address bus 212 and access to microprocessor is via data bus 211 and various interrupt lead 214 to 217.

The ROM 202 comprises an array of ultraviolet erasible programmable read-only memory devices having a storage capability of 32 K 8-bit bytes. The bytes constitute the program instructions for the microprocessor 201 described in further detail hereinafter. The bytes are selectively read from the ROM in accordance with address information on the address bus 212 and a read signal on the control bus 210, ROM 202 applying the bits of the byte in parallel to the data bus 211.

The RAM 203 consists of an array of random access memories which store 7 K 8 -bit bytes. Access to the RAM arrays is provided by the appropriate address on the address bus 212 together with a read signal on the control bus 210. The 8 -bit byte thus accessed in RAM 203 is thereupon applied in parallel to the data bus 211. The storage of data into RAM 203 is provided by an address instruction on bus 212 together with a write signal on the control bus 210. The 8-bit byte concurrently on the data bus 211 is thereupon written into the addressed storage locations in RAM 203.

The programmable timer 204 comprises a multiplicity of clock driven presettable counter circuits for defining timed intervals. When selected by an appropriate address on the address bus concurrently with a write signal on the control bus, the programmable timer presets the appropriate timing circuit therein in accordance with the data byte or bytes on the data bus, which data byte or bytes define the interval to be timed. The counter, thus preset, down counts until it reaches its initial zero count whereupon an interrupt signal is sent via lead 217 to the microprocessor.

Each of the USARTs 205 and 206 is arranged in substantially the same manner and is of the type which are generally available as integrated circuit chips. It is the general function of the USART to convert parallel words to serial words or to conversely convert serial words to parallel words.

In the event that the microprocessor desires to send serial words to lead SD (which normally has the marking state applied thereto by the USART), it first places the USART in a parallel-to-serial mode. This is provided by applying the appropriate address word on address bus 212 to select the USART, an appropriate command on data bus 211 together with a write signal on the control bus 210. The byte on the data bus constitutes a command for the USART to convert each subsequent parallel byte on data bus 211 to a serial asynchronous 7-bit data character at the 1200 baud rate, which character is to include one stop bit and an even parity bit. Following this command, the microprocessor 201 commands the USART to raise the RS lead, which command also enables the USART to transmit data written into its register. As previously recalled, the raising of the RS lead enables the modem 106 to raise carrier. The microprocessor then addresses the USART with a "write data" command together with a write signal ordering the USART to write the data byte on the data bus into the USART register. The USART shifts this data out, inserting the start, stop and parity bits into the character, onto the SD lead. At the conclusion of the transmission of the character, the USART raises the TXRDY lead and this signal is passed through the OR gate 218 or 219 to an interrupt lead 215 or 216 to an interrupt input of the microprocessor advising the microprocessor that the USART is available for the next data character. Microprocessor then sends the next "write data command". After the microprocessor has sent all the characters it desires to send, it applies a command to shut down the USART and return to its initial condition.

When data is received by modem 106, it initially raises the CD lead. This signal is passed through OR gate 220 to interrupt lead 214 to the input of the microprocessor, advising the microprocessor that data is to be received by USART 206. The microprocessor thereupon sends a command to the USART 206 to write the incoming serial data on lead RD into the USART register and the USART writes in the character and provides additional checks such as the proper start and stop bit reception (framing) and even parity of the character.

When the data character is fully stored in the USART, it raises the RXRDY lead to pass an interrupt signal via the OR gate 219 to the microprocessor. The microprocessor thereupon sends read commands to the USART to apply the bits of the character in parallel onto the data bus and to read out the USART status whether the character was properly received (parity, framing, etc.)

When the microprocessor decides that the transaction has been completed (by recognizing an end of text character or detecting a carrier drop from the terminal as previously noted), the microprocessor sends a command to the USART 206 to shut down and thereafter ignore further incoming signals on lead RD.

The parallel in/out circuits 207 comprise a plurality of registers which when addressed will store commands on the data bus. These registers are selected by the address on the address bus 212 and respond to a write signal on control bus 210 together with the appropriate command on data bus 211 to raise or lower the signal on leads DX, PLCK, BD SEL0 and BD SEL1 and A–D. The information in the parallel in/out circuits and the consequent signals on the above-identified output leads will remain in these registers and on the leads until overwritten by new commands from the microprocessor.

Figure 3:
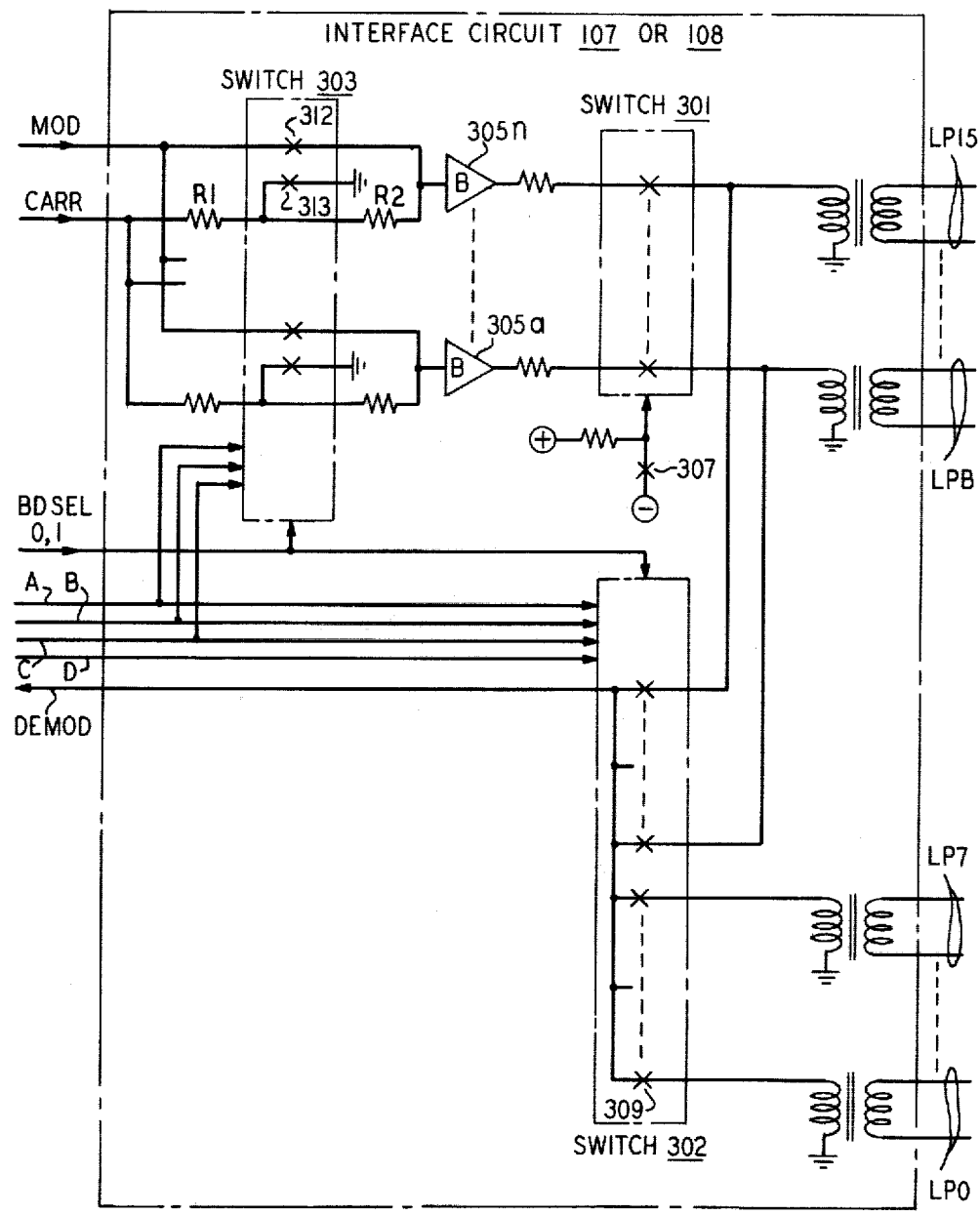
FIG. 3 depicts, in schematic form, certain interface and multipoint switch circuitry used in the central controller in accordance with this inventior.

FIG. 3 shows the details of the interface circuit, it being noted that interface circuit 107 and interface circuit 108 are arranged in substantially the same manner. In general, the interface circuit includes 8-switch analog switches 301, 16-switch analog switches 302 and 16-switch analog switches 303 together with buffers 305a to 305n. Assuming that the interface circuit is arranged for a 2-wire operation such as interface circuit 108, switch 307 is closed. This provides a disabling potential to all the switches in analog switches 301 and these switches are therefore open for the 2-wire operation. Prior to selection of any port, analog switches 302 and 303 are also open, whereby none of leads MOD, DEMOD or CARR are connected to any of the ports.

Analog switches 302 constitutes 16 normally open switches. A selected one of the switches is closed when an enabling signal is applied to lead BD SEL and an appropriate pattern is applied to leads ABCD to thereby connect lead DEMOD to a selected one of ports LP0 to LP15. For example, assuming that the interface circuit has been selected by an enabling signal on lead BD SEL and a pattern identifying the first switch 309 is applied to leads ABCD, switch 309 is thereupon closed. This connects lead DEMOD to the first port LP0. Two-way half duplex communication can thus be provided between the port LP0 and lead DEMOD. When the interface circuit is operated in the 4-wire mode, switch 307 is open. This provides an enabling potential to all switches in switches 301. The closure of switches 301 connects the output of buffers 305(a) to 305(n) to ports LP8 to LP15. Initially an inhibiting signal is applied to lead BD SEL and all of switches 302 and 303 are therefore open. Under this condition, carrier signals on lead CARR are applied through the R1 and R2 resistors to buffers 305(a) to 305(n) and thus to ports LP8-LP15. These ports constitute the send pairs for the 4-wire paths.

Assume now that a 4-wire port is to be selected. An enabling signal is applied to lead BD SEL to enable switches 302 and 303 and a pattern defining the port to be selected is applied to leads ABCD. In the 4-wire mode, only eight 4-wire ports are available and the pattern on leads ABC defines one of eight ports. An appropriate one of eight switches in switch 302 is closed to connect lead DEMOD to one of eight ports LP0-LP7 in the same manner as previously described for the 2-wire mode. This connects lead DEMOD to the receive pair of the 4-wire port. Switches 303, enabled by the enabling signal on lead BD SEL, selects a pair of switches (one of eight pairs of a total of 16 switches) in accordance with the pattern on leads ABC. Assume, for example, that port LP15 is to be selected (which selection occurs in concurrence with the selection of port LP7 to constitute the 4wire port). The application of the appropriate pattern on leads ABC closes switches 312 and 313. The closure of switches 313 shorts the junction between resistors R1 and R2, thus shorting out the carrier on lead CARR applied to buffer 305(n). At the same time, lead MOD is extended by way of switch 312 to the input of buffer 305(n). The signal applied to port LP15 is therefore derived from lead MOD rather than lead CARR. The operated conditions of these switches are then maintained until the signal on leads ABCD are removed or an inhibiting signal is applied to lead BD SEL.

Figure 4:
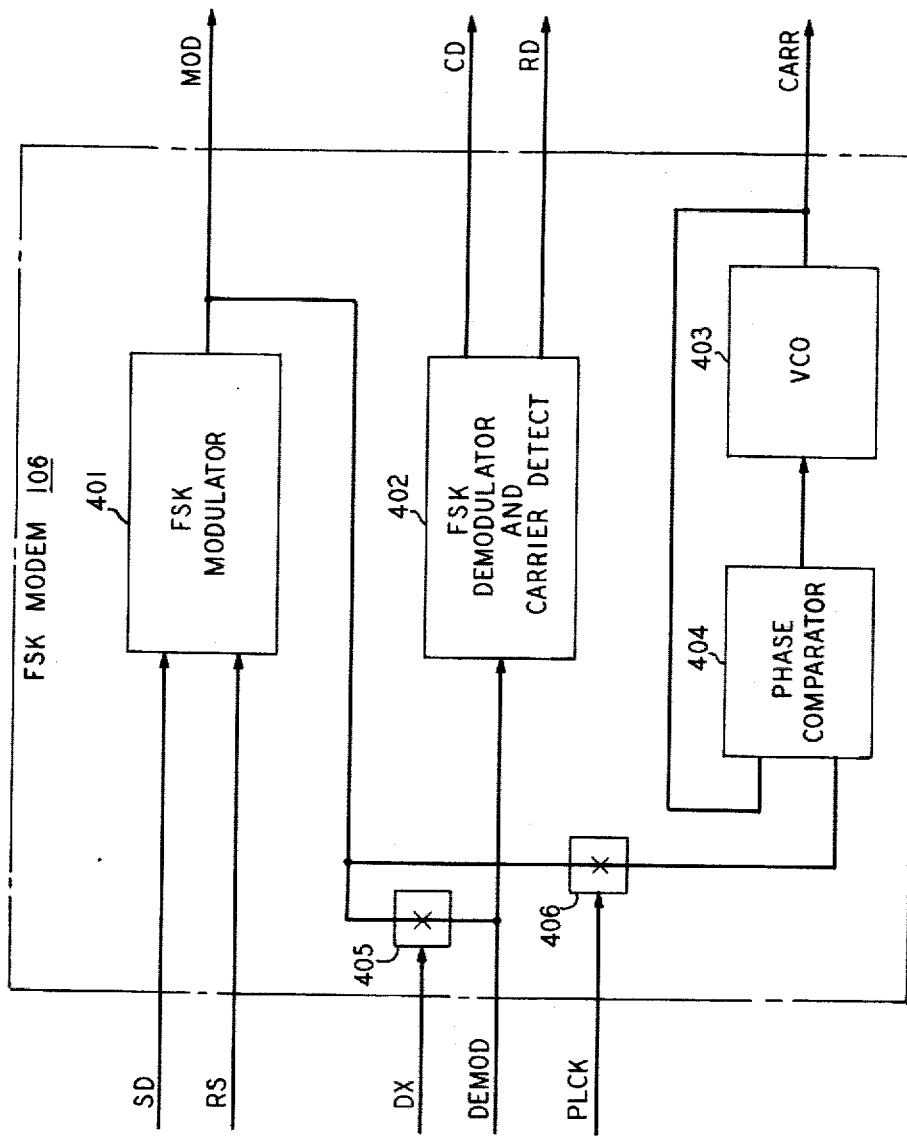
FIG. 4 shows, in schematic form, a modem used in the central controller.

The details of the modem such as modem 106 are shown in FIG. 4. In general, the modem includes an FSK modulator 401, an FSK demodulator and carrier detector 402 and a carrier supply which includes a voltage controlled oscillator 403 and a phase comparator 404 which form a phase lock loop. The modem also includes switches 405 and 406 which, in the initial condition, are open.

The FSK modulator 401 is turned on by an enabling signal on lead RS. As a consequence thereof, a 1200 Hz tone appears at the output of the FSK modulator, which tone is normally passed to lead MOD. When the microcomputer 105 applies data to lead SD, the output FSK modulator 401 is frequency shifted and the resultant frequency shift data output is thus applied to lead MOD.

The FSK demodulator and carrier detect circuit 402 functions to examine the incoming frequency shift signals on lead DEMOD. When incoming carrier is on lead DEMOD, the carrier detect equipment raises lead CD and when frequency shift data signals are on lead DEMOD, the corresponding baseband data signals ae serially applied to lead RD.

The carrier signals applied to lead CARR are normally supplied by the output of voltage controlled oscillator 403. The input to the oscillator is provided by the phase comparator 404. In the initial condition, there is no external control of the phase comparator since switch 406 is open and the output of the voltage controlled oscillator 403 is therefore its normal free-running frequency.

Assume now that the microcomputer 105 is going to switch the modem to the half duplex mode. The enabling signal is applied to lead DX to close switch 405. This closes the connection between the MOD lead and the DEMOD lead. The incoming signals on lead DEMOD are supported to the FSK demodulator and carrier detector 402 as previously described. The outgoing signals at the output of the FSK modulator 401, however, are now passed through switch 405 to the DEMOD lead. The DEMOD lead therefore provides the 2-way transmission for the modem in the half duplex mode.

As described above, when the modem is operated in the full duplex mode, the carrier output on lead CARR is periodically phase locked to the carrier signal on lead MOD. The microcomputer provides this function by enabling lead PLCK. This closes switch 406 to thereby connect lead MOD to an input of the phase comparator 404. The phase comparator thereupon compares the phase of the output of the FSK modulator 401 (presently sending just carrier) with the output of the voltage controlled oscillator 403, shifting the phase of the voltage controlled oscillator 403 until the two inputs to the comparator 404 are in phase, thus phase locking the output of the voltage controlled oscillator 403 to the output of the FSK modulator 401.

ROM 202 stores instructions for routines in a plurality of processes or programs for the microprocessor 201, one of the programs being normally run and the other processes being started by interrupts to perform a routine terminated by the setting of one of timers 204 and, in some circumstances, by the placing of a USART in a mode, so that another interrupt will occur to recall the process. Each process is described below to provide sufficient information to develop the appropriate instructions for the process stored in ROM 202.

Generally, the philosophy of each process is to determine the state of this process or program and the current state of the microcomputer peripheral hardware to obtain instructions from ROM 202. These instructions from ROM 202 (and the other state information) are utilized to develop commands that define the new state of the process and the modes or states of the peripheral hardware. More specifically, with respect to an interrupt process, a change from the current state of the process or program to the new state is initiated by an interrupt of the type described above, at which time the microprocessor 201 will examine the current state together with the several inputs from the microcomputer peripheral hardware and thereby determine the new state and develop commands (and instructions) for the peripheral hardware.

Figure 5:
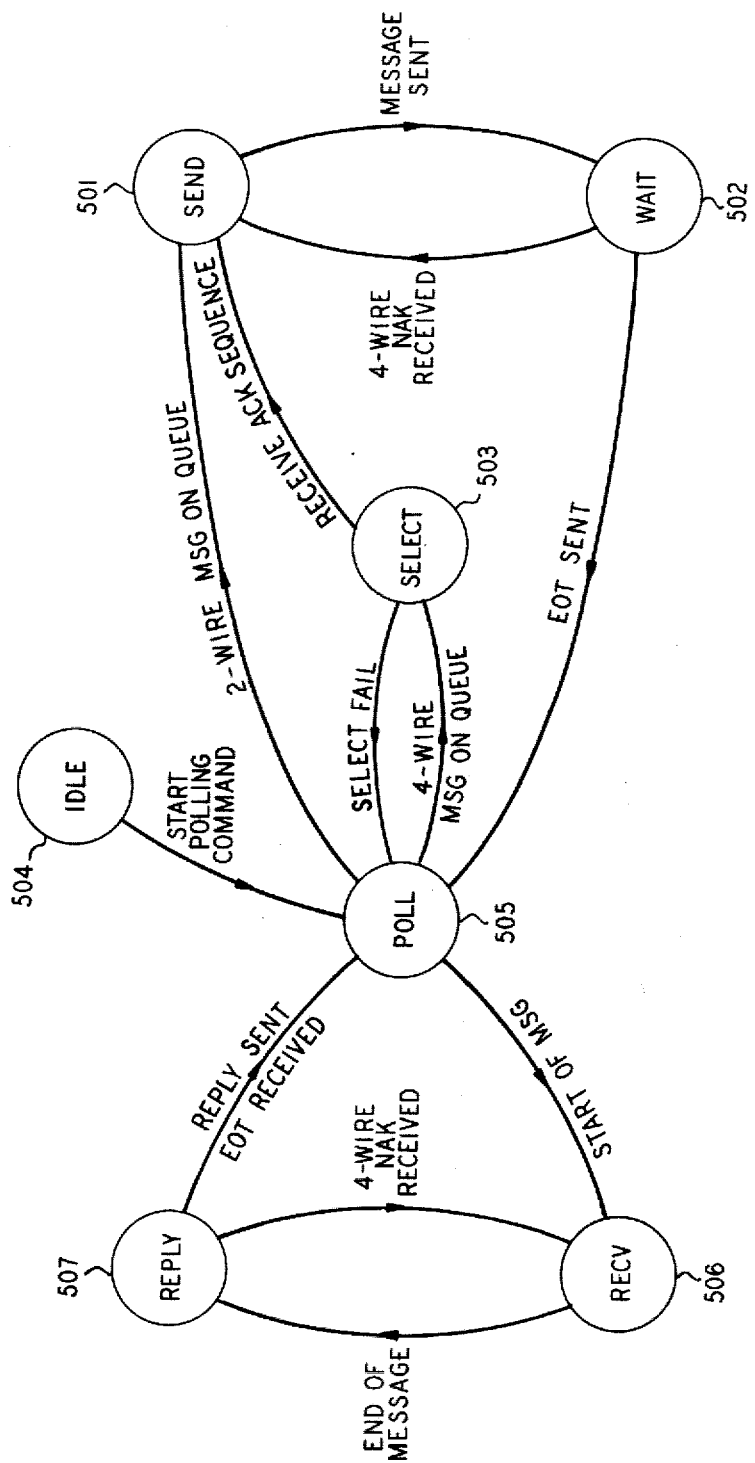
FIG. 5 depicts a state diagram of the various states of the process followed by the microcomputer in handling transactions with the several data terminals.

The state diagram shown in FIG. 5 defines the interrupt process (or software) used by the microprocessor for transactions with the terminals. In this terminal transaction process there are seven principle states. These states are generally shown in FIG. 5 as the send state 501, the wait state 502, the select state 503, the idle state 504, the poll state 505, the receive state 506 and the reply state 507. The initial state of the process constitutes the idle state 504. When the microcomputer 105 receives the message from the data base 101 to initiate polling, it will advance the process from the idle state into the poll state 505. In the poll state, the microprocessor looks for messages to transmit to the terminals and, in the absence thereof, the process remains in the poll state and microprocessor 201 accesses the first item on the polling list as previously described. In the event that the terminal does not have a message to send or if the terminal fails to respond to the polling, the process stays in the poll state. In this event, the microprocessor repeats the operations of looking for messages in the buffer and, in the absence thereof, accessing the next item in the poll list.

In the event that there is a message in the buffer for transmission to a terminal, the microprocessor 201 will determine the terminal type and the process will go into the select state 503 if the message is destined for a 4-wire terminal or go into the send state 501 if the message is destined for a 2-wire terminal. In the select state, the data station controller 104 sends the select sequence to the 4-wire terminal, as previously described. In the event that the 4-wire terminal does not return a positive acknowledgement, the program returns to the poll state to provide functions previously described. If the controller receives a positive acknowledgement from the 4-wire terminal, the program then proceeds to the send state.

The microprocessor with the program in the send state 501 provides the information and control to the data station controller to deliver messages, one character at a time, to either the 2-wire or 4-wire terminal. When the last character in the message has been transmitted, the process will enter the wait state 502. In the wait state, the microprocessor awaits the reply from the terminal for the message just sent. In the case of a 4-wire terminal, if the terminal returns a negative acknowledgement, the process goes back into the send state to resend the message. In the wait state 502, if the microprocessor receives a positive acknowledgement from either the 2-wire or 4-wire terminal, a negative acknowledgement from a 2-wire terminal or a negative acknowledgement after sending the message the second time to a 4-wire terminal, the process will advance back to the poll state. Back in the poll state 505, with respect to the 2-wire terminal, if the microprocessor has received negative acknowledgement from the terminal, the program will again go into the send state and the data station controller 104 will resend the message.

When the controller polls a terminal having a transaction message and detects the beginning of the message sent from the terminal, the process advances from the poll state to the receive state 506. In the receive state, the microprocessor will store each character of the message in its buffer and look for the end of the message, performing the parity and sanity functions previously described. Upon receiving the end of the message, the process then advances from the negative state to the reply state 507. While in the reply state, the data station controller will determine and transmit the appropriate reply to the terminal. If the transaction is with a 4-wire terminal and the reply is negative acknowledgement, the process will again return to the receive state in anticipation of the retransmission of the message from the 4-wire terminal. If the reply to the terminal, whether 2-wire or 4-wire is a positive acknowledgement, the process will return to the poll state when microcomputer 105 receives the EOT from the terminal. The process also returns to the poll state if the microcomputer receives a negative acknowledgement from a 4-wire terminal after having sent a second negative acknowledgement to a message from a 4-wire terminal. Upon the return to the poll state, the microprocessor places the message in a queue for reformatting.

In the idle state 504 of the terminal transaction process, the microprocessor 201 will determine if it has received the initial polling instruction from the data base, in which event microprocessor 201 will advance the process to the poll state 505 as previously described. More specifically, the microprocessor will advance the process of the "carrier off" substate 601 (FIG. 6A) of the poll state. This process advancement is implemented by the microprocessor storing representations of "carrier off" substate 601 and poll state 505 in predetermined locations of RAM 203. In addition microprocessor 201 sets programmable timer 204 to time a delay interval.

Figure 6A:
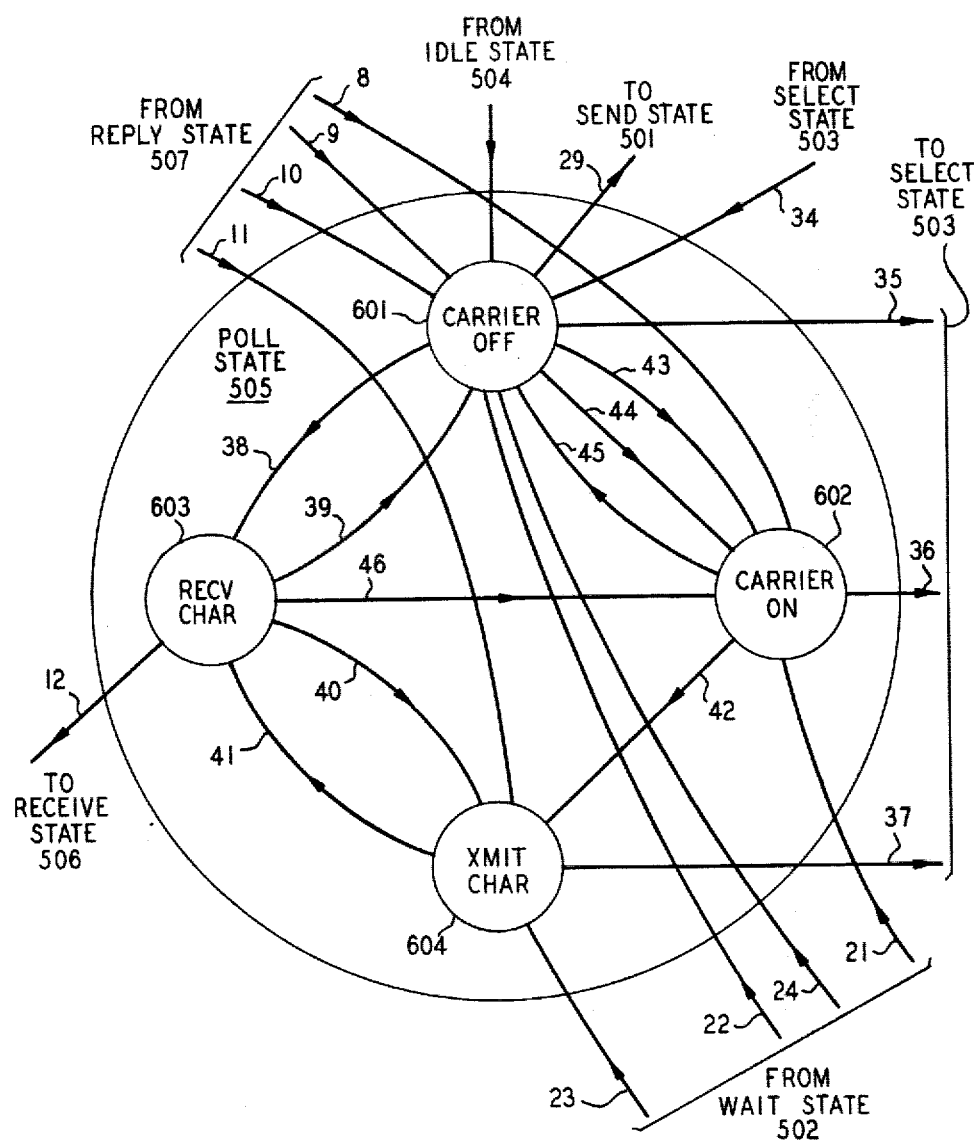

The details of poll state 505, as shown in FIG. 6A, constitute various substates thereof and process flow advance lines by which the process advances to and from the various substates and other states. The advance lines are further individually disclosed in FIG. 6B by an identifying number therefor and an accompanying description of the state of the peripheral hardware (microprocessor inputs) which, when the process is in the particular substate, causes the process to flow or advance along this advance line and causes microprocessor 201 to follow instructions whose description also accompanies the identifying number of the advance line in FIG. 6B.

Upon the time out of timer 204, microprocessor 201 obtains a set of instructions from ROM 202, which instructions direct the microprocessor to address the predetermined storage locations in RAM 203 storing the representations of the "carrier off" substate 601 and poll state 505. Microprocessor 201, having obtained these "carrier off" substate representations from RAM 203, is now instructed to address the message buffer area in RAM 203 to determine if there are any messages to send to any terminal.

Assume that there are no messages in the buffer for the terminals. In this event, the next series of instructions are to access a location in the RAM which stores a pointer defining the next item in the poll list. With this information, the microprocessor then proceeds to access this next poll list item.

Assume that this item in the list defines a 2-wire terminal. The microprocessor is instructed to access this next time and store the various elements or parts of the item in predetermined memory locations in the RAM 203. The next instruction directs the microprocessor to access that predetermined memory location in RAM 203 storing the portion or element of the item defining the terminal type. The microprocessor thereby determines that this is a 2-wire terminal and prepares to advance the process along advance line 43 (FIG. 6A). In accordance therewith, microprocessor 201 provides appropriate commands to the parallel in/out circuit 207 to raise lead DX, preparing the modem 106 to operate in the half-duplex mode.

The next instructions from ROM 202 direct the microprocessor to access the predetermined memory locations in the RAM storing the address information of the terminal. Upn obtaining this information, the microprocessor applies the appropriate command signals by way of the control, data and address buses to the parallel I/O circuits 207 to energize lead BD SEL1 and to further energize the appropriate A, B, C and D leads to thereby select interface circuit 108 and extend the transmission path from the modem 106 to the 2-wire output port connected to the telephone line extending to the terminal.

The next instruction directs the microprocessor to reaccess the type information in RAM 203. Since the type information defines a 2-wire terminal, the next series of instructions to the microprocessor will cause it to issue commands to USART 206 to place it in the appropriate transmitting mode (to transmit 7-bit data characters at the 1200 baud rate, which characters are to include one stop bit and an even parity bit) and to raise request to send lead RS which, as previously described, enables the modem 106 to send carrier.

The final instruction of this routine enables the microprocessor to set one of the timers in programmable timer 204 and to insert into the RAM the new substate of this process, which is "carrier on" substate 602. At this point, the process stops executing until the next interrupt.

At the termination of the timed interval, timer 204 sends an interrupt to the microprocessor which thereupon determines from RAM 203 the substate of the process, which substate is at this time the "carrier on" substate. The microprocessor thereupon advances the process along advance line 45, executing a series of instructions which cause it to issue a command to USART 206 to turn off lead RS to thereby drop the carrier. The microprocessor then sets programmable timer 204 and stores the "carrier off" substate 601 in the RAM, which actions terminate the process.

Assume now that the 2-wire polled terminal has a stored message for the data base. It responds to the carrier signal by raising its carrier and, after a predetermined interval, by sending the message in the format appropriate for 2-wire terminals. When model 106 detects the carrer, it energizes lead CD. This causes an interrupt and microprocessor 201 thereupon determines that it is in the "carrier off" substate 601. In this state, having received the "CD" interrupt signal, the microprocessor advances the process along advance line 38 by executing a series of instructions which includes storing the new "receive character" substate 603 in the RAM, commanding USART 206 to go to the serial-toparallel mode and resetting programmable timer 204. This terminates this routine and the microcomputer now awaits the message from the terminal.

When the first character is received from the terminal and fully stored in USART 206, an RXRDY interrupt is passed to the microprocessor 201, as previously described. The microprocessor determines that it is in the "receive character" substate 603 and that there was an RXRDY interrupt from USART 206 and thereupon executes a series of instructions. These instructions include commands to the USART 206 to read the first character out to the data bus for storage by microprocessor 201 in RAM 203. The microprocessor then reads the status of the USART 206 to determine whether the character has been properly received with respect to parity, framing and so on.

In the event that the first character of the transaction message has not been properly received, the microprocessor will set a "variable" in the RAM 203, for subsequent access when the end of the message is received to preclude a response back to the terminal. The microprocessor will thereupon maintain the process in its present "receive character" substate until incoming carrier is removed by the terminal whereupon the microprocessor will proceed back along advance line 39 to the "carrier off" substate 601. The message from the terminal is thus ignored if the first character is improperly received.

Assume now that the first character has been properly received. The microprocessor determines if the first character is a valid character for a 2-wire terminal. If this character is not valid, the microprocessor proceeds through the same procedure described above when a character is improperly received by the USART 206.

Assume now that the first character is a proper character. The process advances along advance line 12 and a series of instructions executed by the microprocessor includes obtaining an available buffer in RAM 203, inserting this valid first character together with a pointer to the RAM location storing the item defining the terminal into this available buffer and changing in the RAM 203 the state of the process to the "receive character" substate 701 of the "receive" state 506, as seen in FIG. 7A (with accompanying table 7B).

Upon receipt of the second character from the terminal, USART 206 interrupts the microprocessor which, in the "receive character" substate 701 of the receiver state, reads out the second character from the USART and stores it in the RAM in the same manner as described previously and again reads out the status of the USART 206. In the event that the USART status indicates that the character has not been received properly, a "variable" is set in the RAM to preclude further storage of characters in the buffer. In the event that the USART status indicates the character has been received properly, a validity check is performed on this second character and, if that check fails, the "variable" is set in the same manner as previously described above and the buffer is released. In addition, an accumulated redundancy check is calculated for this character, which check will be accumulated with all subsequent characters. Finally, in the event that the character was properly received by the USART 206 and the sanity checks were successful, the microprocessor inserts this second character in the RAM buffer and terminates the routine in anticipation of the next successive character from the terminal.

For each successive character this process is again repeated and a new cumulative check is calculated. Upon receiving the character following the end of text character, which following character is the redundancy check character, a comparison is made with the calculated redundancy check. In the event that there is an improper equality or comparison, the above-described "variable" is set. Assume, however, that the message is properly received and there is a comparison between the received redundancy check character and the calculated check sum. This portion of the routine is terminated without setting the above-described "variable" in the RAM 203.

The next interrupt is provided by the termination of carrier from the terminal. The microprocessor accesses the RAM memory location storing the "variable" to determine if the message was received properly. In the event that the "variable" indicates that the message was received properly, the miicroprocessor proceeds to load the positive acknowledgement character ACK into a predetermined location in the RAM 203. The microprocessor 201 thereupon proceeds along advance line 6 and follows a sequence of instructions to store the new "carrier on" substate 801 (FIG. 8A) of the "reply" state 507 in the RAM, initiate the programmable timer 204 to time for a predetermined interval, place the USART 206 in the transmission mode and turn on the RS lead to send carrier to the terminal.

At the end of the predetermined interval, programmable timer 204 again provides an interrupt. The microprocessor 201, upon receiving this interrupt, advances the process along advance line 4 to the "transmit character" substate 802 of the reply state 507. It also commands USART 206 to go to the parallel-to-serial mode. In this mode, the USART 206 provides an interrupt from its TXRDY terminal when its buffer is empty. At this time, of course, no character has been loaded into the USART 206 and its buffer, being empty, provides another interrupt back to microprocessor 201. In response to this USART interrupt, the microprocessor performs a series of instructions which enable it to access the predetermined location in the RAM 203 storing the terminal type (which, in this case, defines a 2-wire terminal) and, upon this determination, the microprocessor loads the appropriate first character of the reply to the terminal into USART 206. After the character is transmitted, USART 206 again sends an interrupt to the microprocessor, which again determines the terminal type and, upon this determination, loads the character ACK stored in the RAM 203 into the USART 206 and sets a flag in a memory location of the RAM to indicate that this character (ACK) is the last character in the reply and, finally, the microprocessor sets the programmable timer 204 for a timed interval.

When the timer 204 interrupt occurs, the process advances along line 1 and the microprocessor 201 again determines the type of terminal and upon determination thereof disables USART 206, thereby turning off lead RS and, in addition, the microprocessor stores the new "carrier off" substate 803 of the reply state 507 in the RAM. The terminal responds to the ACK reply by turning on its carrier, providing the signal on lead CD which thereupon passes an interrupt to the microprocessor. The microprocessor in the "carrier off" substate 803 and in response to the CD lead interrupt places USART 206 in the serial-to-parallel mode and writes into RAM 203 the new "receive character" substate 804 of the reply state. The USART 206 will now receive from the terminal the first character of the end of transmission (EOT) sequence and, when this character is fully stored by USART 206, it will send an RXRDY interrupt to the microprocessor. The microprocessor 201 extracts this character from USART 206, reads the status of the USART and provides a validity check of the character, repeating this process for each character of the EOT sequence. After the last character of the sequence is transmitted, the terminal turns off its carrier to provide another interrupt to the microprocessor. The microprocessor thereupon accesses the memory location in RAM 203 defining the terminal type and accesses the memory location in RAM 203 storing the "variable". In the event that the EOT sequence has been fully received and the "variable" indicates a positive acknowledgement (ACK), the transaction message received from the terminal is placed in a "reformat" queue in the RAM together with an indication that this is a terminal "inquiry" message. The microprocessor then stores the "carrier off" substate 601 of the poll state 505 in the RAM and sets the programmable timer 204 whereupon the next terminal will be polled as described above.

In the event that a received character in the transaction message fails a check when the process is in the "receive character" substate 701 of the receive state 506, the microprocessor releases the buffer memory in the RAM priorly reserved for storage of the message to make these locations available for other purposes. The process of the program proceeds in the same manner as described for the reception of valid characters, advancing to the "carrier on" substate 801 of the reply state upon the termination of carrier from the terminal. The process differs at this point, however, in that a NAK character rather than an ACK character is inserted in RAM memory. Consequently, when the reply message is sent to the terminal, the acknowledgement sequence will include the NAK character to form a negative acknowledgement sequence which advises the terminal that the message has not been properly received. The process in the reply state 507 is otherwise the same with the process being advanced thereafter to the poll state 505 after receiving the end of transmission sequence from the terminal. Of course, since the microprocessor has released the buffer, it will not retain the transaction message for reformatting.

The process, returning to the poll state, proceeds along advance line 10 to the "carrier off" substate 601. In this substate, the buffers are again examined for any messages destined for the terminal and in the absence of any messages the next item in the poll list is accessed and placed in the predetermined storage locations of the RAM 203 in the same manner as previously described. The appropriate selection signals are sent to interface circuits 107 and 108 to connect modem 106 to the output port extending to the remote terminal.

Assume now that another 2-wire terminal is being polled and this terminal has no message to send. The connection to the output port is therefore provided by way of interface circuit 108, modem 106 is placed in the halfduplex mode and the microprocessor commands USART 206 to turn on lead RS and stores the "carrier on" substate 602 of the poll state in the RAM. Upon receiving the next timer interrupt, the microprocessor commands the USART 206 to turn off the RS lead, sets the programmable timer 204 to await the terminal's response to the carrier polling signal and writes the "carrier off" substate 601 into the RAM. Since this terminal has no message to send, it does not provide a response. Accordingly, the programmable timer 204 times out and sends a timing interrupt to the microprocessor 201. The microprocessor in the "carrier off" substate 601 thereupon examines the buffer memory in the RAM 203 to see if any messages are destined for any of the terminals and in the absence of any messages proceeds to the next item.

Assume now that the next item in the list defines a 4-wire terminal which has a transaction message to send. In the "carrier off" substate 601 this item is stored in the above-described predetermined locations of the RAM 203 memory. The first element in the item defining the terminal type is accessed and the microprocessor determines that this is a 4-wire terminal. The process now proceeds along advance line 44. Microprocessor 201 obtains the appropriate sequence of instructions from ROM 202 and issues a series of commands to parallel in/out circuit 207 to set lead DX (changing modem 106 to the full-duplex mode), to drop leads BD SEL0 and BD SEL1 to thereby assure that the connections in the interface circuits 107 and 108 are disconnected and to raise lead PLCK to prepare modem 106 to lock its continuous carrier to the modem output.

Additional commands by the microprocessor place USART 206 in the transmission mode and raise lead RS to thereby turn on the modem 106 carrier. Finally, the microprocessor commands the programmable timer 204 to set a timer therein and writes the "carrier on" substate 602 designation into the RAM memory. When programmable timer 204 times out, the process proceeds along line 42 and microprocessor 201 commands parallel in/out circuit 207 to energize lead BD SEL0 and to apply the appropriate permutation of signals to leads A-D to thereby control interface circuit 107 to connect modem 106 to the 4-wire output port for the terminal. At the same time, lead PLCK is dropped. The microprocessor also commands USART 206 to go into the parallel-to-serial mode and writes the "transmit character" substate 604 into the RAM memory 203. USART 206, having no character in its register, provides an interrupt to the microprocessor 201 which now proceeds, upon each TXRDY interrupt from USART 206, to go through a routine wherein the several characters of the 4-wire terminal polling sequence are individually written into the USART 206 for transmission to the terminal. All but one of these characters are defined by the ROM 202 instructions, the one exception being a poll character which is calculated from the poll/select number in the poll list item.

When the last character is written into the USART 206, an indication thereof is set in the RAM memory and the programmable timer 204 is again set. Upon the expiration of the timer, the process advances along line 41 and the microprocessor commands the parallel in/out circuit 207 to again raise lead PLCK and commands USART 206 to go to the serial-to-parallel mode. The microprocessor 201 writes the "receive character" substate 603 of the poll state 504 designation into the RAM memory. When the first character is received by USART 206, an interrupt is sent to the microprocessor which proceeds to read the character out of USART 206, store it in memory and check the status of USART 206, in the same manner as the process examined the first character from a 2-wire terminal. Assuming that the first character is valid, the process now goes to the "receive character" substate 701 of the receive state 506 and the microprocessor accesses the element in the poll list item defining the terminal type in order to check the validity of this first word and in the event that the character is valid, acquires a buffer in RAM 203, inserting in the initial position a pointer defining the memory location of the list and also storing therein this first character, all in the same manner as this process is done for the first character from the 2-wire terminal. In the case of the 4-wire terminal, however, the microprocessor also proceeds to calculate the redundancy check of the first character rather than waiting for the second character. Subsequent characters in the message from the terminal are similarly read, checked as to status and validity, and if their status and validity are good, stored in the buffer memory. Alternatively, if there is a bad status or validity, the buffer memory is released and a flag is written into a predetermined location of the RAM memory. In addition, the redundancy check is maintained for each properly received character. This routine is therefore repeated for each character until the redundancy check character is received.

Upon the reception of the redundancy check character, the same redundancy checks are performed by the microprocessor 201 as were performed for the 2-wire terminal and the locations storing the flag are accessed to determine whether any errors in transmission occurred. If the flag indicates no error and there is a good redundancy check comparison, an ACK character is written into the RAM memory 203; otherwise a NAK character is written therein. The process advances along line 5 and the microprocessor now commands the parallel in/out circuit 207 to lower the PLCK lead, commands USART 206 to go to the parallel-to-serial mode and writes the indication for the "transmit character" substate 802 of the reply state into the RAM memory. With the USART 206 set to the parallel-to-serial mode and no character in its register, it sends an interrupt to the microprocessor. The microprocessor thereupon accesses the ACK or NAK character from the RAM memory and writes this character into the USART for transmission to the terminal. It also writes into RAM memory an indication that this is the last character of the sequence so that it will ignore the next USART 206 interrupt and finally it will set the programmable timer 204 for a timed interval.

When the programmable timer times out and sends the interrupt, the process advances along line 3 and the microprocessor instructs parallel in/out circuit 207 to raise the PLCK lead and commands USART 206 to go to the serial-to-parallel mode. The microprocessor also writes the "receive character" substate 804 of the reply state into the RAM memory.

Assume now that the transaction message was improperly received from the terminal and a NAK character has been returned by data station controller 104. The 4-wire terminal will thereupon resend the transaction message. Upon reception of the first character of the transaction message, USART 206 sends an interrupt to the microprocessor, which reads out the character in the USART 206 and provides a status check. The microprocessor then accesses the element in the poll list item defining the terminal type and the storage location in the RAM memory storing the acknowledgement character which, in this case, is NAK. The microprocessor advances the process along line 7 and provides a validity check of the character read out of USART 206 and writes into the RAM the designation of the "receive character" substate 701 of the receive state. This first character and the subsequent characters are thereafter received and stored in the buffer memory, if properly received, in the same manner as previously described. If this transmission is improperly received, the controller sends a NAK and goes to poll state 505 to search the message buffers for a message destined for the terminals.

In the event that the data station controller 104 has sent an ACK to the terminal, the terminal responds by sending back the EOT character. When this character is received in USART 206, an interrupt is sent to the microprocessor 201 which reads out and decodes the EOT character and transfers the message from the RAM buffer to the reformat queue and inserts the indication that this is an inquiry message from a terminal.

The process now returns to the poll state 505 wherein the buffer is searched to see if a message or messages are destined for the terminal and in the absence of such message the next poll list item is accessed and placed in the predetermined locations of the RAM 203. Microprocessor 201 accesses the element in the item defining the type of terminal and also accesses the element defining the type of terminal last polled. If the terminal priorly polled, as described above, is a 4-wire type and in the event that this next terminal is a 2-wire type, the microprocessor goes along line 8 and writes the designation of the "carrier on" substate 602 of the poll state into the RAM. The above-described process for polling 2-wire terminals will thereupon be repeated. In the event, however, that this next terminal is a 4-wire type, the microprocessor 201 goes along line 11 and commands parallel in/out circuit 207 to raise the appropriate selection and address signals onto its output leads, commands USART 206 to go to the parallel-to-serial mode and writes the designation of the "transmit character" substate 604 for the poll state into RAM 203 whereby microcomputer 105 is placed in the condition to poll this next terminal.

In the event that the prior terminal sent an unsuccessful message, microprocessor 201, after sending the NAK, sets a timer in programmable timer 204 to permit the phase lock of the carrier on lead CARR. After the time-out interrupt, the state of the process is changed to the poll state 505, the RAM buffer is accessed for messages to any of the terminals and, in the absence thereof, the next item in the poll list is accessed, in the same manner as described above, and the type of terminal is compared with the type of terminal previously polled to prepare for the polling of this next terminal.

Assume now that the next 4-wire terminal to be polled does not have a message. In this event the terminal raises carrier and returns an EOT character or, alternatively, fails to respond. When the EOT character is received, USART 206 provides an interrupt signal from the RXRDY port through OR gate 219. Microprocessor 201 reads out and stores the character in USART 206 to determine if it has received the start-of-text STX character. Finding that the character is not an STX character, it proceeds to access the next item in the list. In the event that this terminal has failed to respond, programmable timer 204 times out and upon this interrupt microprocessor 201 similarly proceeds to go to the next item in the poll list.

As noted above, messages from data base 101 destined to the several terminals are delivered into buffer queues in RAM 203 by microcomputer 105, each buffer storing a message having also stored therein a pointer which points to that item in the poll list which identifies the terminal to which the message is destined. Additionally, as noted above, microcomputer 105 has removed the header messages destined to 4-wire terminals, the buffer therefore containing only the message text.

Assume now that the microcomputer buffer has a message destined for a 2-wire terminal and further assume that a transaction with a terminal has been completed. The microprocessor, in poll state 505, is presently looking for an available message to a terminal in the buffer and finds this message destined for the 2-wire terminal.

Upon locating the message in the buffer, microprocessor 201 stores a pair of pointers in RAM 203, one pointing to the location of the beginning of the buffer and the other pointing to the first character of message and accesses the pointer in the buffer defining the location of the poll list item corresponding to the destination terminal. Microprocessor 201 now accesses the poll list item to determine the terminal type which we have assumed to be a 2-wire terminal and the process thereupon proceeds to advance line 29. The rest of the elements of the item are also accessed and microprocessor 201 commands parallel in/out circuit 207 to provide the appropriate address signals to leads BD SEL1 and A-D and to provide the appropriate signal to lead DX to place modem 106 in the half-duplex mode. Microprocessor 201 also commands USART 206 to set output lead RS which, as previously described, turns on the modem 106 carrier. Microprocessor 201 also writes the designation for the "carrier on" substate 901 (FIG. 9A) of the send state 501 into RAM 203 and commands programmable timer 204 to set a timing interval for the carrier signal of modem 106.

After the carrier has been transmitted for the predetermined interval, programmable timer 204 times out to send an interrupt to microprocessor 201. The process advances via line 28 and microprocessor 201 now writes the "transmit character" substate 902 of the send state into RAM memory 203 and commands USART 206 to go to the parallel-to-serial mode. USART 206, now having a character stored in its register, provides an output signal at terminal TXRDY, which signal is passed through OR gate 219 to provide the next interrupt to microprocessor 201. Microprocessor 201 accesses the pointer pointing to the first character of the message. This first character is then retrieved from RAM 203 and written into USART 206 and thus transmitted to the terminal. The pointer pointing to this first character is incremented to point at the second character. Microprocessor 201 also examines this first character, looking for the ETX character.

After the first character is transmitted to the terminal, USART 206 pulses output port TXRDY to again send an interrupt to microprocessor 201 and the process is repeated for the next and the following characters in the message buffer until the ETX character at the end of the message is detected. On the next interrupt, when the ETX character is transmitted, microprocessor 201 writes the redundancy check character into USART 206, sets programmable timer 204 to provide a sufficient interval for the check character to be transmitted and sets a flag into memory to inhibit outputting of further characters to USART 206. When the interrupt signal is received from programmable timer 204, the process proceeds along advance line 27 and microprocessor 201 instructs USART 206 to drop the RS lead, permitting the output carrier of modem 106 to drop. Microprocessor 201 writes into RAM 203 the new "carrier off" substate 1001 (FIG. 10A) of the wait state 502. Microprocessor 105 now awaits the acknowledgement from the terminal.

In returning its acknowledgement, the 2-wire terminal first raises its carrier. Modem 106 provides a signal onto lead CD and this is passed by way of OR gate 220 as an interrupt signal to microprocessor 201. Microprocessor 201 thereupon writes in the designation for the "receive character" substate 1002 of the wait state into RAM array 203 and commands USART 206 to go to the serial-to-parallel mode.

When the first character of the acknowledgement sequence is received by modem 106, it is passed by way of lead RD to USART 206. When the character is fully stored, USART 206 pulses port RXRDY to send an interrupt to microprocessor 201. Microprocessor 201 reads out the character in USART 206, checks its status and the validity of the received character and awaits the reception of the next character. This procedure is then followed by each character until the last character is received, which character in the acknowledgement sequence will either be an ACK to indicate that the message was received properly or a NAK to indicate that the message was received improperly. In either event, microprocessor 201 will wait for carrier to drop. Microprocessor 201 then discards the message in the buffer if an ACK sequence was received and retains the message if a NAK sequence was received, setting a counter to thereafter initiate a second transmission. If this, in fact, was a second transmission, it is placed on the reformat queue with an indication in the buffer that the message was undeliverable. The message will thereupon be returned to the data base 101 as described in detail hereinafter.

Microprocessor 201 now accesses the element in the poll list item defining the terminal type. Since this is a 2-wire terminal, the process goes to advance line 18 and microprocessor 201 in response to the ACK character stores the character EOT in memory. Microprocessor 201 writes the "carrier on" substate 1003 into RAM 203 and commands USART 206 to raise the RS lead, sending carrier to the terminal and instructs programmable timer 204 to set a timer to define the carrier interval.

When programmable timer 204 times out and interrupts microprocessor 201, it commands USART 206 to go to the parallel-to-serial mode and its writes the "transmit character" substate 1004 into RAM 203. USART 206 thereupon pulses port TXRDY to again interrupt microprocessor 201. The microprocessor now proceeds to write the EOT sequence into USART 206, sending each character of the sequence to modem 106 and, upon sending the last character, microprocessor 201 resets programmable timer 204 and places a flag in RAM 203 to indicate the end of the transmission of the EOT sequence.

Upon the time out of programmable timer 204 and the consequent interrupt sent to microprocessor 201, the process proceeds to advance line 22 and the microprocessor instructs USART 206 to turn off the RS lead. The microprocessor also writes in the "carrier off" substate 601 of the poll state 505. In the event that a positive acknowledgement sequence (ACK) was received from the terminal, the microcomputer proceeds to again go through the initial steps of the poll state wherein it re-examines the buffers and then polls the next terminal. In the event that a negative acknowledgement sequence (NAK) was received from the terminal, microprocessor 201 sets programmable timer 204 to provide a predetermined delay before the message buffers are re-examined which, since the message will be resent to the terminal, permits the terminal time to recognize the carrier drop and gives the terminal sufficient time to thereafter recognize the new select sequence.

Assume now that there is a message destined for a 4-wire terminal in the message buffer. With the microprocessor process in the poll state, the microprocessor searches the message buffers and finds this message. Upon the detection of the message, microprocessor 201 sets the pointers to the beginning of the buffer and to the first character in the message and accesses the poll item pointer to obtain the item defining the terminal that will receive the message. Microprocessor 201 thereupon accesses the element describing the terminal type and upon determining that the message is destined for a 4-wire terminal writes the select state 503 into RAM 203. Microprocessor 201 now determines the terminal type of the last terminal with which it had a transaction and, if this was a 2-wire terminal, proceeds along advance line 35 and writes the "carrier on" substate 1101 (FIG. 11A) of the select state into RAM 203 and goes through the previously described phase locking sequence of the modulator 106 carrier. At the conclusion of the phase lock sequence, microprocessor 201 writes the "transmit character" substate 1102 of the select state. In either event, microprocessor 201 commands USART 206 to go to the parallel-to-serial mode and proceeds to place the characters of the select sequence into USART 206 for passage to modem 106 in the same manner as the microcomputer generates the poll sequence for the 4-wire terminal with the exception that the select character is calculated from the poll/select number rather than the poll character for insertion into the sequence.

Following the transmission of the select sequence, microprocessor 201 writes the "receive character" substate 1103 into RAM 203 and places USART 206 in the serial-to-parallel mode. Microcomputer 105 now awaits a response from the 4-wire terminal which will either be an ACK sequence or the NAK character. When the character or sequence is received, microcomputer 105 provides the parity and sanity checks on the received character or sequence. In the event that the received character is the NAK character, microprocessor 201 writes the "transmit character" substate 1102 into RAM 203 and the transmission of the select sequence is repeated. At the same time, a counter is incremented in RAM 203. If there are four unsuccessful tries, when the NAK character is received, the process proceeds along advance line 34 and microprocessor 201 will place the message on the reformat queue with an indication that the message has not been successfully delivered and writes the "carrier on" substate 602 of the poll state 505 into RAM 203.

In the event that a positive acknowledgement sequence (ACK) is received from the terminal, the process advances along line 30 and microprocessor 201 writes the "transmit character" substate 902 of the send state 501 into RAM 203. The microprocessor commands USART 206 to go to the parallel-to-serial mode. USART 206 thereupon sends an interrupt to microprocessor 201 and the microprocessor withdraws the characters from the message buffer in the same manner as previously described for the 2-wire terminal. Following the time out after the transmission of the character redundancy character, the process advances along line 26 and microprocessor 201 writes the "receive character" substate 1002 of the wait state 502 into RAM 203, repeats the phase lock sequence for modem 106 and commands USART 206 to go to the serial-to-parallel mode. Data station controller 104 now awaits the acknowledgement response from the terminal. When this acknowledgement is received, microprocessor 201 provides the previously described status check and stores the character in its memory.

In the event that the received character is the ACK character, when the process is in "receive character" substate 1002, the message is freed from the buffer and the EOT character is written into RAM 203. USART 206 is placed in the parallel-to-serial mode and microprocessor 201 writes the "transmit character" substate 1004 into RAM 203. The EOT character is placed in USART 206 for transmission to the terminal and programmable timer 204 is set. After the time out of programmable timer 204, microprocessor 201 writes the poll state 505 into RAM 203 and the microcomputer thereupon returns to the previously described process of looking through the buffers and polling the terminals.

In the event that the NAK character is received from the terminal, when the process is in "receive character" substate 1002, a counter is set and the pointer identifying the characters of the message is returned to the first character and microprocessor 201 writes the "transmit character" substate 902 of the send state 501 into RAM 203. The message is therefore resent to the terminal.

In the event that the message has previously been unsuccessfully transmitted to the terminal and another NAK has been received, the message is placed on the reformat queue with an indication that it is undeliverable. The message buffer is now freed and the EOT character is now written into RAM 203, USART 206 is placed in the serial-to-parallel mode and the "transmit character" substate 1004 is written to RAM 203. The EOT character is thus returned to the terminal in the same manner as it was returned when an ACK is received and the process thereafter returns to the poll state.

The process for exchanging messages with the data base, hereinafter referred to as the data base transaction process, is an interrupt process used for transactions with the data base. The state diagram for this process is shown in FIG. 13. In this data base transaction process there are six principle states. These states are generally shown in FIG. 13 as the idle state 1301, the send state 1302, the wait state 1303, the end of transmission (EOT) state 1304, the receive state 1305, and the reply state 1306.

The initial state of the process constitutes idle state 1301. In this state, data station controller 104 checks the incoming signals received from data base 101. These incoming signals will constitute either a predetermined poll character indicating that the data base is ready to accept a message or a start of message sequence indicating that the data base is sending a message.

Assume first that the poll character is received from the data base. Microprocessor 201 is instructed to await for the incoming carrier from the data base to drop. Upon the carrier dropping, microprocessor 201 searches for pointers identifying available messages at the output of the RAM 203 message queue for messages destined to the data base. If the search fails to locate such a message, the process stays in the idle state. In the event, however, that the message queue identifies a message destined for the data base, the process advances to send state 1302.

When microcomputer 105 enters send state 1302, microprocessor 201 obtains instructions to command USART 205 to raise carrier by raising the signal on lead LRS. Thereafter, microprocessor 201 extracts the message, character by character, from RAM 203 inserting the characters into USART 205 for application by way of lead LSD to modem 208 for transmission to data base 101 in the same manner that USART 206 transmitted messages to the several terminals. When the last character of the message is transmitted, microprocessor 201 commands USART 205 to turn off carrier and then advances the data base transaction process to wait state 1303.

The data base 101 advantageously checks the parity and sanity of the message it had received and returns either a positive (ACK) or negative (NAK) acknowledgement sequence. The carrier for the acknowledgement from data base 101 is received, raising lead LCD from modem 208 and the characters of the sequence are sequentially received on lead LRD and thus registered in USART 205.

In the event this response is an ACK sequence microprocessor 201, with the data base transaction process in the wait state 1303, releases the message buffer storing the message and advances the process to EOT state 1304. If the response is a NAK sequence, microprocessor 201 returns the pointer indicating an available message back to the input or head of the message queue for messages destined for the data base and advances the process to the EOT state.

In the EOT state 1304 the microprocessor instructs USART 205 to raise carrier, obtains the stored EOT characters and sequentially stores the characters in the registers of USART 205. The EOT sequence is thus transmitted to the data base and, upon the completion of this transmission, microprocessor 201 advances the process back to idle state 1301.

Assume now that a start of message sequence is received from data base 101. This sequence is received by modem 208 and inserted into USART 205. In the idle state 1301, microprocessor 201 detects the sequence and advances the process to receive state 1305. In receive state 1305 microprocessor 201 is instructed to obtain a buffer in RAM 203 for the message from the data base and mark this message as a response message destined for a terminal. Microprocessor 201 places the start of message sequence into the buffer, performs the above-described parity and sanity checks on subsequent characters, places these characters in the buffer and, after receiving the end of text character, performs the redundancy check process described above. In addition, microprocessor 201 examines the terminal identification number in the message header, searches the poll list to locate the item containing the corresponding terminal number and inserts a pointer to this item into the buffer. If all the above-described search and checks are successful, an ACK character is inserted in RAM 203. In the event, however, that one or more of the checks are unsuccessful, a NAK character is inserted in RAM 203 and the buffer is released. In either event, microprocessor 201 advances to reply state 1306.

Upon the process advancing to reply state 1306, microprocessor 201 instructs USART 205 to turn on modem 208 carrier. Microprocessor 201 thereupon obtains the reply sequence, which will include the ACK or NAK character, in RAM 203. After this reply sequence is passed by USART 205 to modem 208 and then on to data base 101, microprocessor 201 instructs USART 205 to turn off carrier. In reply state 1303, microcomputer 105 now awaits the EOT response from data base 101. When this response is received and registered in USART 205, microprocessor 201 determines whether an ACK or NAK sequence was transmitted to the data base. In the event that an ACK sequence has been transmitted, microprocessor 201 places the message on the reformat queue for the reformat process to handle the message, as described above. If a NAK sequence had been returned, the buffer had been released and the message, of course, is not placed on the reformat queue. In either event, microprocessor 201 advances the process to idle state 1301.

Figure 12:
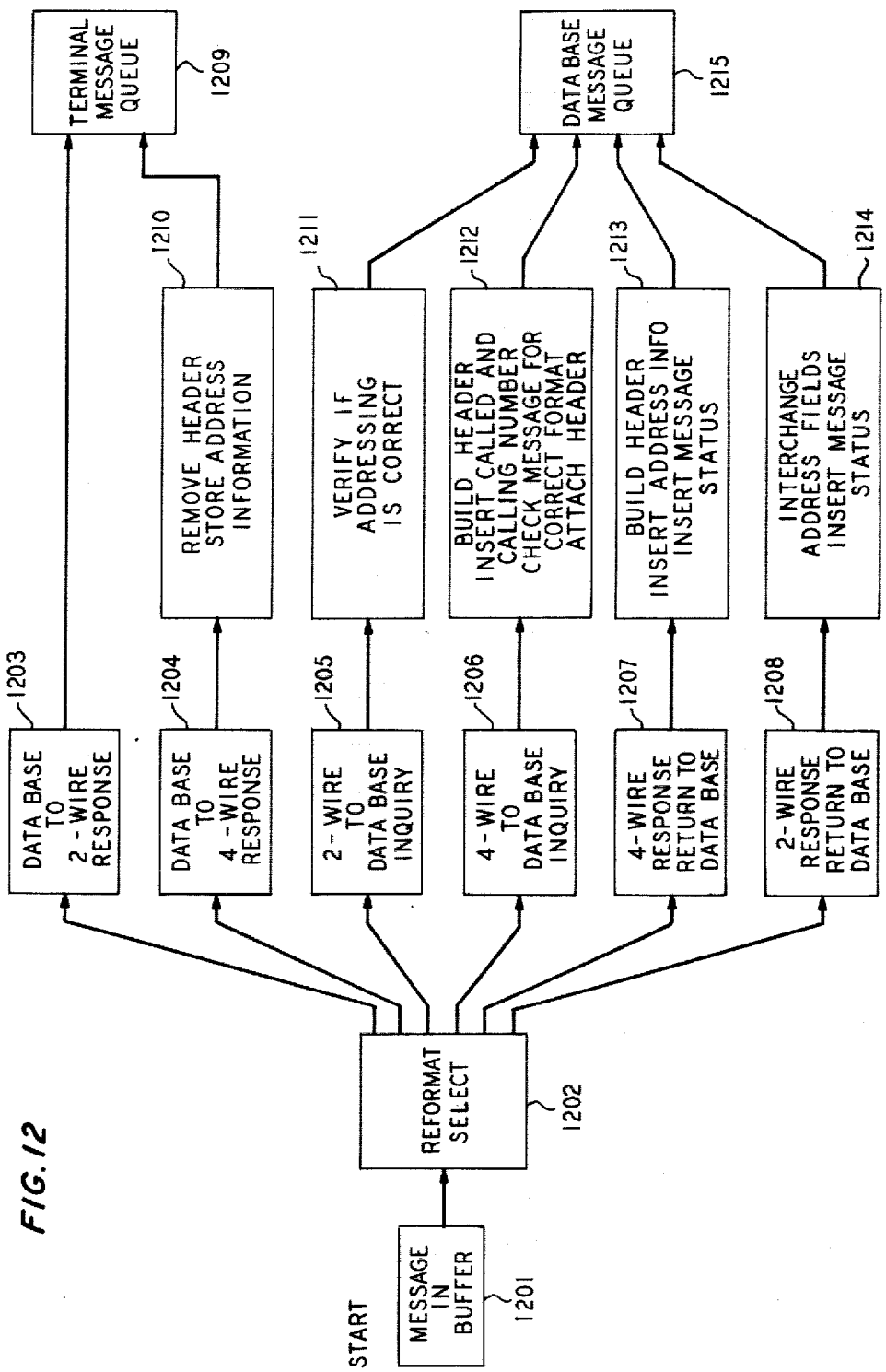
FIG. 12 depicts a flow diagram of a process followed by the microcomputer for reformatting certain transactions or messages.

The reformat program is a continuous process as shown in FIG. 12. This is the lowest priority normally run program which is interruptable by any of the above-described priority interrupt programs or processes. The philosophy of the reformat program is that it will be initiated by the appearance of a message in the RAM 203 buffer and will thereupon attempt to go through a complete reformat program terminated by placing the reformat message in a message queue. In the event that the reformat process is interrupted by one of the interrupt programs, the reformat process is halted until the interrupt program routine is completed. The reformat process will then resume at the point that it had been interrupted.

As shown in FIG. 12, the process handles six situations, namely, the distribution of messages from the data base 101 to 2-wire terminals which process is initiated by subroutine 1203, the distribution of messages from the data base to 4-wire terminals which is initiated by subroutine 1204, the collection of messages from 2-wire terminals initiated by subroutine 1205, the collection of messages from 4-wire terminal initiated by subroutine 1206, the return of undeliverable messages to the data base that were originally destined for 4-wire terminals which is initiated by subroutine 1207 and the return of undeliverable messages to the data base destined for 2-wire terminals which is initiated by subroutine 1208.

As noted above, the reformat process is initiated when a message has been placed in the RAM buffer for distribution to a terminal or for transmission to the data base. The location of this message is identified by subroutine 1201 and, upon the detection of the presence of the message, the reformat process advances to the reformat select subroutine 1202. In the reformat select subroutine, the previously described indication as to whether the message is an inquiry message from a terminal, a response message from data base 101 or an undeliverable message to a terminal which is to be returned to the data base is now accessed from the RAM buffer. In addition, the previously distributed pointer to the poll list item is accessed to obtain the item and to identify the terminal type. Upon this determination, the process proceeds to the appropriate one of the six above-identified initial subroutines.

Assume now that the message in the RAM buffer has been distributed by the data base to a 2-wire terminal. This information, as described above, is determined in the reformat select subroutine 1202 and the reformat process proceeds to the 2-wire response subroutine 1203. In this subroutine, a running check sum of the characters in the message is calculated to recalculate the redundancy check character and, upon this recalculation and the insertion of the character into the message, a pointer to the message buffer containing this message is placed in the RAM message queue for messages destined for terminals. Upon this pointer reaching the output of the queue, it will be detected by the terminal transaction process or program described above to initiate the process of the transmission of the message to the 2-wire terminal.

If the reformat select subroutine 1202 determines from the poll list item that the message is destined for a 4-wire terminal, the process advances to 4-wire response subroutine 1204. Microprocessor 201 is thereupon issued a sequence of instructions identified as subroutine 1210. With these instructions, the header of the message is removed and microprocessor 201 stores in RAM 203 the address information defining the originator of the message and the destination terminal. This set of instructions is implemented by placing the pointer to the first character of the message text whereby when the message is subsequently transmitted the header portion will be omitted. The microprocessor then recalculates the redundancy check character for this text portion, inserting it into the message as described above. When the check is completed, a pointer to this message is placed in the terminal message queue to indicate to the above-described terminal transaction process that a message is available for transmission to a 4-wire terminal.

Assume now that a message is collected from a 2-wire terminal and placed on the message buffer as described above. The reformat select subroutine 1202 identifies that this is an inquiry message and, upon accessing the poll list item, determines that the inquiry message is from a 2-wire terminal. Upon this determination, the process advances to 2-wire inquiry subroutine 1205. In this subroutine, microprocessor 201 is issued a set of instructions shown as subroutine 1211, which instructions define the process to verify if the addressing of the message is correct. More specifically, microprocessor 201 is instructed to examine the poll list item and confirm that the address of the message in the buffer is permissable in accordance with the information in the poll list item. Upon confirmation thereof, a pointer to the buffer containing the message is placed in the message queue for messages destined for the data base.

If the message in the message buffer is received from a 4-wire terminal, reformat select subroutine 1202 identifies that this is an inquiry message and, upon accessing the poll list item, determines that this inquiry message is from a 4-wire terminal. The process thereupon advances to the 4-wire inquiry subroutine 1206 and obtains a set of instructions identified as subroutine 1212. In accordance with these instructions, the microprocessor obtains an indication from the poll list item to abstract certain data from the message text, which certain data is normally placed there by the 4-wire terminal. Microprocessor 201 thereupon builds a header using this abstracted data to identify the terminating address and using other data in the poll list item to identify the originating terminal. In accordance with further instructions for microprocessor 201, it also eliminates the abstracted information from the message text and then recalculates the redundancy check character. Upon the completion of these instructions, microprocessor 201 inserts a pointer to the first character of the message header into the message queue for the data base to thereby indicate that this message is available for transmission to the data base.

Assume now that a message to a 4-wire terminal is undeliverable. Reformat select subroutine 1202, upon locating this message, detects the indication that the message was undeliverable. Upon access of the poll list item and determining that this undeliverable message is destined to a 4-wire terminal, the process advances to the 4-wire response subroutine 1207. Microprocessor 201 obtains a set of instructions identified by subroutine 1213. In these instructions, microprocessor 201 builds the message header in the same way as previously described for an inquiry message from a 4-wire terminal with the exception that the calling and called address numbers are interchanged. In addition, microprocessor 201 inserts an indication that the message is undeliverable, recalculates the redundancy check character and places a pointer in the message queue which pointer now points at the first character in the header.

If a message to a 2-wire terminal is undeliverable, reformat select subroutine 1202 detects this indication and advances the process to 2-wire response subroutine 1208 when the poll list item is accessed. Microprocessor 201 receives a set of instructions identified as subroutine 1214. These instructions instruct microprocessor 201 to interchange the calling and called address numbers and to insert the indication that the message is undeliverable. The redundancy check character is recalculated and the pointer, set to the first character in the header, is placed in the message queue to the data base to enable transmission to the data base.

Although a specific embodiment of this invention has been shown and described, it will be understood that various modifications may be made without departing from the spirit of this invention.

We claim:

1. In a polling system wherein each of a plurality of terminals (102, 103) is sequentially selected to communicate with a common station (104) in response to selection signals, the station including means (201, 203) for determining the terminal to be selected and signaling and signal responsive means (206, 207, 106) for transmitting the selection signals to select the determined terminal and for communicating with the terminal thus selected, characterized in that
the common station further includes memory means (202) for storing instructions defining a first and second communication procedure individually used for selecting different ones of the terminals, means (201) responsive to the determining means for accessing the memory means to obtain the instructions defining the procedure individual to the terminal to be selected, and means (201, 206, 207) responsive to the accessed instructions for controlling the signaling and signal responsive means to transmit the selection signals in accordance with the communication procedure defined thereby.

2. In a polling system in accordance with claim 1 wherein the first communication procedure instructions define a predetermined sequence of various selection signals and the second communication procedure instructions define a different sequence of various selection signals.

3. In a polling system in accordance with claim 2 wherein the predetermined sequence of selection signals includes a sequence of data characters.

4. In a polling system in accordance with claim 3 wherein the different sequence of signals includes a prolonged signal.

5. In a polling system in accordance with claim 1 wherein the determining means includes means for storing an identification signal and a communication procedure type for each terminal and means for reading the identification signal and procedure type of each determined terminal.

6. In a polling system in accordance with claim 5 wherein the accessing means includes means responsive to the reading of the procedure type of the terminal for obtaining the instructions defining the procedure individually used by the terminal.

7. In a polling system in accordance with claim 6 wherein the transmitting and communicating means includes means responsive to the read identification signal and the obtained instructions for transmitting the selection signal in a signal sequence defined by the instructions.

8. In a polling system in accordance with claim 1 wherein the controlling means includes means responsive to the obtained instructions for instructing the signaling and signal responsive means to transmit a predetermined sequence of signals.

9. In a polling system in accordance with claim 1 wherein the controlling means includes means responsive to the obtained instructions for defining the first communication procedure for instructing the signaling and signal responsive means to identify the reception of certain signals from the selected terminal.

10. In a polling system in accordance with claim 9 wherein the controlling means includes means responsive to the obtained instructions defining the second communication procedure for instructing the signaling and signal responsive means to identify the reception of other certan signals from the selected terminal.

11. In a polling system in accordance with claim 9 wherein the controlling means includes means responsive to the obtained instructions defining the first communication procedure and the identification of the reception of the certain signals for instructing the signaling and signal responsive means to transmit selected signals back to the terminal.

12. In a polling system in accordance with claim 11 wherein the controlling means includes means responsive to the obtained instructions defining the second communication procedure for instructing the signaling and signal responsive means to transmit other selected signals to the terminal.

13. In a polling system including a plurality of data terminals and a common station including signaling and signal responsive means for communicating with the terminals, a method of sequentially selecting each terminal for communication therewith alternatively using a first and second communication procedure appropriate for the terminal, comprising the steps of:

storing a list of items, each item identifying an individual one of the terminals to be selected;

storing a first and second set of instructions individually defining the communication procedure appropriate for the signaling and signal responsive means to communicate with a terminal using the first and second communication procedure;

sequentially accessing each item of the stored list and determining the terminal to be selected for communication;

accessing the stored instructions to obtain the set defining the communication procedure appropriate to communicate with the selected terminal; and controlling the signaling and signal responsive means to communicate selection signals for individually selecting the terminal determined by the accessed stored item in accordance with the communication procedure defined by the accessed set of instructions.

14. In a polling system, a method of selecting terminals for communication in accordance with claim 13, wherein each item also identifies the communication procedure used by the terminal and the step of sequentially accessing each item includes the step of determining the communication procedure used by the selected terminal.

15. In a polling system, a method of sequentially selecting terminals for communication, in accordance with claim 14, and including the further step of:

controlling the signaling and signal responsive means to interchange signals with the selected terminal in accordance with the communication procedure defined by the accessed set of instructions.

* * * * *